(12) United States Patent
Beri et al.

(10) Patent No.: US 11,561,357 B2
(45) Date of Patent: Jan. 24, 2023

(54) FIBER OPTIC CONNECTION MODULES

(71) Applicant: COMMSCOPE CONNECTIVITY BELGIUM BVBA, Kessel-Lo (BE)

(72) Inventors: Stefano Beri, Brussels (BE); Jan Watté, Grimbergen (BE); Danny Willy August Verheyden, Kessel-Lo (BE); David Jan Irma Van Baelen, Winksele (BE)

(73) Assignee: CommScope Connectivity Belgium BVBA, Kessel-Lo (BE)

(*) Notice: Subject to any disclaimer, the term of this patent is extended or adjusted under 35 U.S.C. 154(b) by 56 days.

(21) Appl. No.: 16/607,019

(22) PCT Filed: Apr. 18, 2018

(86) PCT No.: PCT/EP2018/059966
§ 371 (c)(1),
(2) Date: Oct. 21, 2019

(87) PCT Pub. No.: WO2018/193005
PCT Pub. Date: Oct. 25, 2018

(65) Prior Publication Data
US 2020/0132957 A1  Apr. 30, 2020

Related U.S. Application Data

(60) Provisional application No. 62/488,286, filed on Apr. 21, 2017.

(51) Int. Cl.
*G02B 6/44* (2006.01)
*G02B 6/36* (2006.01)
*G02B 6/38* (2006.01)

(52) U.S. Cl.
CPC ......... *G02B 6/4471* (2013.01); *G02B 6/3652* (2013.01); *G02B 6/3806* (2013.01); *G02B 6/3809* (2013.01); *G02B 6/4453* (2013.01)

(58) Field of Classification Search
CPC .. G02B 6/4471; G02B 6/3652; G02B 6/4453; G02B 6/4454; G02B 6/3809; G02B 6/3806
See application file for complete search history.

(56) References Cited

U.S. PATENT DOCUMENTS

| 4,662,713 A | 5/1987 | Davies | |
|---|---|---|---|
| 2011/0091170 A1* | 4/2011 | Bran de Leon | G02B 6/4452 385/100 |
| 2011/0235986 A1* | 9/2011 | Kaml | G02B 6/4453 385/135 |
| 2014/0072265 A1* | 3/2014 | Ott | G02B 6/4429 385/139 |
| 2014/0124140 A1 | 5/2014 | Verheyden et al. | |

(Continued)

FOREIGN PATENT DOCUMENTS

| CN | 1257212 A | 6/2000 |
|---|---|---|
| CN | 1373376 A | 10/2002 |

(Continued)

OTHER PUBLICATIONS

International Search Report and Written Opinion of the International Searching Authority for International Patent Application No. PCT/EP2018/059966 dated Jul. 27, 2018, 17 pages.

(Continued)

*Primary Examiner* — Thomas A Hollweg
*Assistant Examiner* — Erin D Chiem
(74) *Attorney, Agent, or Firm* — Merchant & Gould P.C.

(57) ABSTRACT

Telecommunications assemblies and modules incorporating demateable fiber optic connection interfaces for coupling non-ferrulized optical fibers.

10 Claims, 27 Drawing Sheets

(56) References Cited

U.S. PATENT DOCUMENTS

| | | | | |
|---|---|---|---|---|
| 2014/0133810 A1* | 5/2014 | Schneider | ............ | G02B 6/4453 |
| | | | | 385/89 |
| 2015/0253514 A1* | 9/2015 | Murray | ................ | G02B 6/3897 |
| | | | | 385/14 |
| 2017/0299831 A1* | 10/2017 | Ott | ........................ | G02B 6/4429 |

FOREIGN PATENT DOCUMENTS

| | | | |
|---|---|---|---|
| CN | 1541343 | A | 10/2004 |
| CN | 1613024 | A | 5/2005 |
| CN | 1615448 | A | 5/2005 |
| CN | 105705976 | A | 6/2016 |
| EP | 0 413 548 | A2 | 2/1991 |
| FR | 2 818 839 | A1 | 6/2002 |
| JP | S59-164521 | A | 9/1984 |
| WO | 2013/117598 | A2 | 8/2013 |
| WO | 2014/052441 | A1 | 4/2014 |
| WO | 2014/052446 | A1 | 4/2014 |
| WO | 2014/118224 | A1 | 8/2014 |
| WO | 2016/043922 | A1 | 3/2016 |
| WO | 2017/223072 | A1 | 12/2017 |
| WO | 2018/020022 | A1 | 2/2018 |
| WO | 2018/037078 | A1 | 3/2018 |
| WO | 2018/085767 | A1 | 5/2018 |

OTHER PUBLICATIONS

Chinese Office Action for Chinese Patent Application No. 201880026378.5 dated Sep. 27, 2021, 18 pages.

* cited by examiner

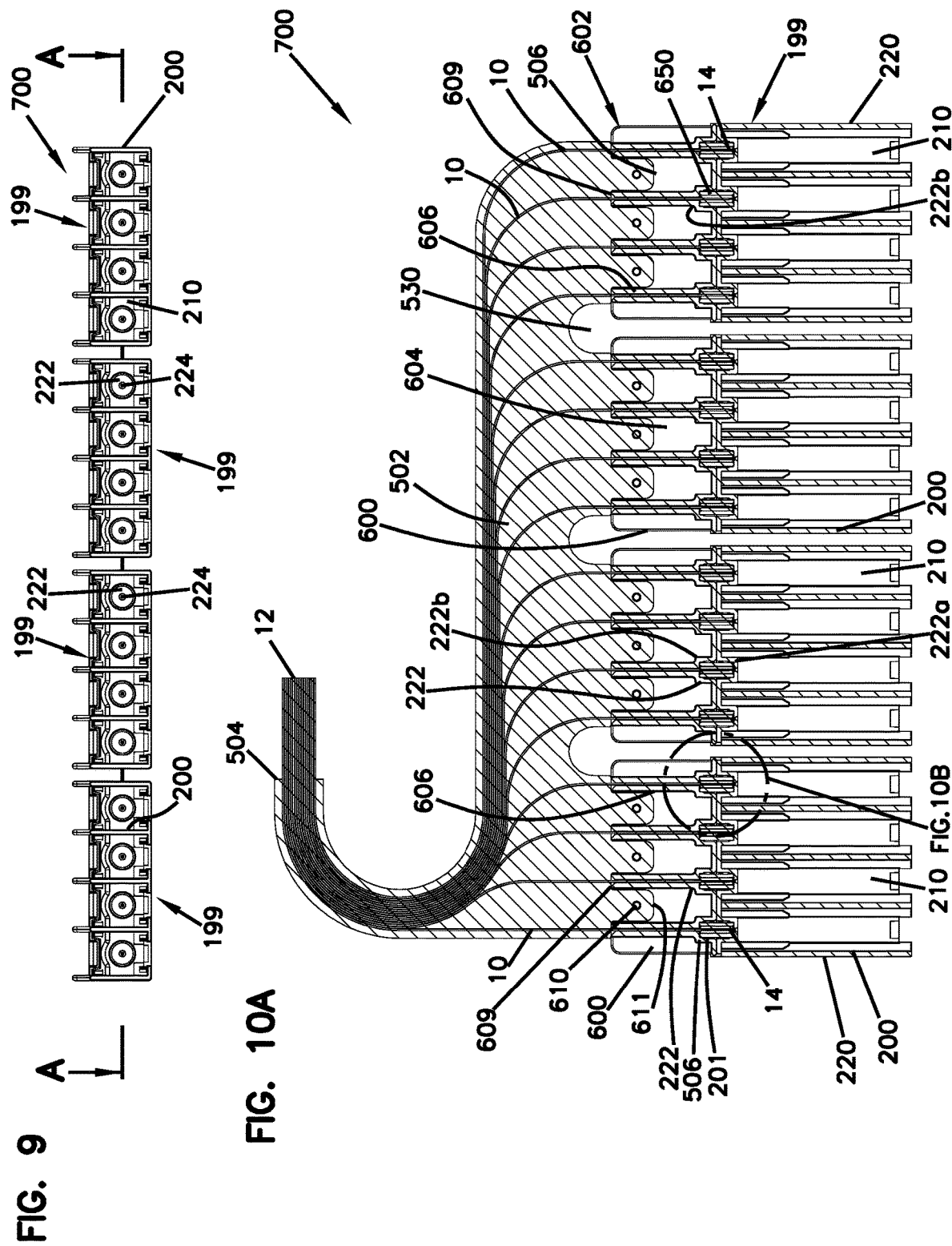

FIBER OPTIC CONNECTION MODULES

CROSS-REFERENCE TO RELATED APPLICATION

This application is a National Stage Application of PCT/EP2018/059966, filed on Apr. 18, 2018, which claims the benefit of U.S. Patent Application Ser. No. 62/488,286, filed on Apr. 21, 2017, the disclosures of which incorporated herein by reference in their entireties. To the extent appropriate, a claim of priority is made to each of the above disclosed applications.

BACKGROUND

As demand for telecommunications increases, fiber optic networks are being extended in more and more areas. Ease of manufacturing and installing network components are important concerns. As a result, there is a need for systems, methods and devices which address this and other concerns.

SUMMARY

Fiber optic modules distribute optical signals. Typically, a cable carrying one or more fibers feeds to the module. The one or more fibers can be spliced, split, fanned out and/or otherwise routed through the module and can be optically coupled via fiber optic connectors that typically provide demateable connection locations for optically coupling to the optical fibers of the module. The fiber optic connectors can be single fiber or multi-fiber connectors. Within the module, the fibers can be routed and managed. The fibers can be loose and managed by a manager such as a tray, spools, bend radius limiters, channels or other structures. Alternatively, the optical fibers can be affixed to and routed along paths on a substrate such as a fiber optic circuit. The substrate can be a relatively flexible substrate or a relatively rigid substrate. Examples of flexible optical circuits and methods of their manufacture are described in PCT Patent Publication No. WO2014052446, PCT Patent Publication No. WO2014052441, and PCT Patent Application No. PCT/US2017/060176, the contents of which applications are hereby incorporated by reference in their entirety.

A typical fiber optic connector includes a ferrule assembly supported at an end of a connector housing. A spring is used to bias the ferrule assembly in a direction towards the connector end relative to the connector housing. The ferrule functions to support an end portion of at least one optical fiber (in the case of a multi-fiber ferrule, the ends of multiple fibers are supported). The ferrule generally has a relatively hard and rigid construction and often is made of a material that includes ceramic or a relatively hard plastic. A typical SC connector ferrule has a diameter of about 2.5 millimeters and a typical LC connector ferrule has a diameter of about 1.25 millimeters. The ferrule has an end face at which a polished end of the optical fiber (or fibers) is located. When two fiber optic connectors are interconnected, the end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule (i.e., the end portion of the optical fiber is non-ferrulized). Instead, the end portion of the optical fiber is a free end portion. The free end portion typically is a bare fiber portion (e.g., a portion of optical fiber including only a core surrounded by one or more cladding layers). The free end portion can also include a coated fiber portion (e.g., a portion of optical fiber including a core, one or more cladding layers surrounding the core, and one or more polymeric layers (e.g., acrylate) surrounding the cladding layers). In certain examples, non-ferrulized optical fibers such as coated optical fibers can have an outer diameter less than 260 microns. In certain examples, bare fibers can have an outer diameter less than 130 microns. It will be appreciated that other fiber diameter sizes may also be used.

Similar to the ferruled connectors described above, fiber optic adapters can be used to assist in optically coupling together two ferrule-less fiber optic connectors. Such fiber optic adapters can include specialized fiber alignment structures adapted to receive non-ferrulized optical fibers such as bare optical fibers. Certain ferrule-less fiber optic connectors and other alignment structures are disclosed in PCT Patent Publication Nos. WO2017/223072 and WO2018/020022, the contents of which applications are hereby incorporated by reference in their entirety.

Ferrules add substantial cost and complexity to the connectorization of optical modules, in part because both sides of the module (the feed-in side and the exit side) are typically connectorized. In addition, ferruled connectors generally occupy more physical space than ferrule-less connectors, and ferrules can require time consuming and costly processing, such as polishing and tuning. Moreover, ferruled connectorization can be vulnerable to dust or other contamination, which can hamper optical signal transmission.

Aspects of the present disclosure relate to the use of ferrule-less connection technology in fiber optic connection modules to provide advantages such as reduced cost, ease of manufacture, reduction in parts, improved resistance to contamination and other advantages. In certain examples, the connection modules can be equipped with demateable fiber optic connection locations that include fiber alignment devices configured for co-axially aligning non-ferrulized optical fibers. The fiber alignment devices can include single fiber or multi-fiber alignment devices. In certain examples, the fiber alignment devices can include fiber alignment grooves (e.g., v-grooves or other shaped grooves), and/or biasing structures such as elastic cantilevers, springs, spring biased elements or the like for pressing optical fibers into alignment grooves, and/or micro bores or passages having a fixed size (i.e., a relatively inelastic construction) for receiving optical fibers with the sizes of the passages being relatively tightly toleranced with respect to the outer diameters of the optical fibers to achieve alignment, and/or alignment passages defined by an elastomeric material, and/or other structures. In certain examples, optical fibers of the module can include non-ferrulized end portions secured (e.g., adhesively secured or mechanically fixed with a crimp, clamp, wedge, fastener, heat-shrink sleeve, or other structure) within the fiber alignment devices. In certain examples, the fiber alignment devices can include index matching gel therein for encapsulating the end faces of the non-ferrulized end portions of optical fibers positioned within the fiber alignment devices for ensuring an effective optical connection when the optical fibers are optically coupled to optical fibers of mating ferrule-less fiber optic connectors, for preventing contamination of the non-ferrulized end portions of the optical fibers, and for cleaning the ferrule-less optical fibers of the mating fiber optic connectors during the coupling/insertion process. In certain examples, the optical fibers of the module can be managed, and/or routed, and/or protected by a management structure such as a tray, a flexible substrate (e.g., a flex-foil), a more rigid substrate or other structures. In certain examples, the module can include an optional housing for enclosing the optical fibers within an interior of the housing. In certain examples, the module can include structure defining connector ports corresponding to the fiber alignment devices for receiving fiber optic connectors desired to be coupled to the optical fibers of the module. In certain examples, the connector ports are accessible from outside the module. In certain examples, connector ports are only provided at one side of each of the fiber alignment devices.

Another aspect of the present disclosure relates to a fiber optic module including a plurality of optical fibers routed through at least a portion of the fiber optic module, and a plurality of demateable fiber optic connection locations each including a fiber alignment device configured for co-axially aligning non-ferrulized optical fibers. Each of the fiber alignment devices includes first and second opposite ends that respectively define first and second fiber openings for receiving non-ferrulized optical fibers desired to be aligned. Each demateable fiber optic connection location includes a connector port-defining structure that defines a connector port corresponding to the first end of the corresponding fiber alignment device. In some examples, the connector port-defining structures can be incorporated into alignment device mounting housings in which the alignment devices are housed. The alignment device mounting housings can include individual housings each defining one connector port and each housing one fiber alignment device corresponding to the connector port, or can include block or ganged style housings each housing a plurality of fiber alignment devices and each defining a plurality of connector ports with each of the connector ports corresponding to one of the plurality of fiber alignment devices. The connector ports are configured to receive and secure ferrule-less fiber optic connectors such that non-ferrulized optical fibers of the ferrule-less fiber optic connectors are received within the first openings of the fiber alignment devices when the ferrule-less fiber optic connectors are inserted into the connector ports. The optical fibers of the fiber optic module have non-ferrulized end portions that are received within the second openings of the fiber alignment devices. In one example, the non-ferrulized end portions are not connectorized and/or connector ports are not provided corresponding to the second openings of the fiber alignment devices.

Another aspect of the present disclosure relates to a demateable fiber optic connection location including a fiber alignment device configured for co-axially aligning non-ferrulized optical fibers. The fiber alignment device includes first and second opposite ends that respectively define first and second fiber openings for receiving non-ferrulized optical fibers desired to be aligned. The demateable fiber optic connection location also includes a connector port-defining structure that defines a connector port corresponding to the first end of the corresponding fiber alignment device. The connector port is configured to receive and secure a ferrule-less fiber optic connector such that a non-ferrulized optical fiber of the ferrule-less fiber optic connector is received within the first opening of the fiber alignment device. The demateable fiber optic connection location also includes an optical fiber having a non-ferrulized end portion that is received and adhesively secured within the second opening of the fiber alignment device. In one example, the non-ferrulized end portion is non-connectorized and a connector port is not provided corresponding to the second opening of the fiber alignment device.

Another aspect of the present disclosure relates to an optical fiber module having an optional shell defining an interior volume, a substrate disposed in the interior volume and supporting a plurality of optical fibers, and at least one but preferably a plurality of optical fiber alignment structures configured for aligning non-ferrulized optical fibers. The optical fibers can include non-ferrulized ends received within the fiber alignment structures. It will be appreciated that the fiber alignment structures can be secured in position relative to the substrate. In one example, the fiber alignment structures can be secured to the substrate by an intermediate mounting structure (e.g., a fiber alignment device mounting housing) that is coupled/secured to the substrate (e.g., to an edge of the substrate) or the fiber alignment structures can be secured to a shell or outer housing in which the substrate is enclosed and to which the substrate may be secured. The intermediate mounting structure can include a connector port defining structure such as a connector port housing or housings each defining one or more connector ports. The connector port housing or housings can define connector ports for receiving ferrule-less fiber optic connectors, and the fiber alignment structures can be housed within the connector port housing or housings in alignment with the connector ports. The connector port housing or housings (e.g., alignment device mounting housings) can include a proximal portion(s) adapted to be secured to the substrate, and the connector ports can be defined by a distal portion(s) of the connector port housing(s). In certain examples, the substrate includes a flexible substrate such as a flexfoil (e.g., Mylar) or alternatively could be a more rigid substrate. In certain examples, the fibers can be routed across and bonded to the substrate. In other examples, the fibers can be more loosely managed by another type of structure such as a tray which may include fiber routing channels, bend radius limiters, spools, fiber guide walls or other fiber guiding structures. The tray may be open (e.g., have an open top so as to not have a fully enclosed interior) or can also be covered. The fiber alignment structures may be secured relative to the tray (e.g., mounted to the tray or mounted to a housing enclosing the tray).

As used throughout the disclosure, the terms "proximal" and "distal" as applied to specific components, refer to the components' orientation with respect to a module. That is, a proximal end of a component is the end that is closer to or faces towards or approximately towards the center of the module, while a distal end of a component is the end that is farther from or faces away or approximately away from the center of the module.

In some examples, the module defines an input port in communication with the interior volume and a set of output ports in communication with the interior volume. It should be appreciated that "input" and "output" are used herein as a convention. In practice, both input ports and output ports can be used for both input and output of optical signals to/from the module.

In some examples, individual fibers from a multi-fiber group are supported and routed on the substrate to each of a plurality of fiber alignment structures that are also supported by the substrate. The fiber alignment structures are adapted for aligning non-ferrulized optical fibers. Each of the fiber alignment structures can be part of a demateable fiber optic connection location. The demateable fiber optic connection locations can include an alignment device mounting housing or housings in which the fiber alignment devices are mounted (e.g., internally housed, secured, held or retained). A proximal portion of each alignment device mounting housing can be configured to attach to the substrate and can define a fiber routing path or paths for routing a module fiber or fibers from the substrate to the fiber alignment device or devices. A distal portion of each alignment device mounting housing can define a connector port or ports corresponding to the fiber alignment device or devices. The connector ports are positioned relative to the fiber alignment devices such then when a ferrule-less fiber optic connector is inserted into one of the connector ports, a non-ferrulized optical fiber of the ferrule-less fiber optic connector is received within a corresponding one of the fiber alignment devices and is optically coupled with one of the optical fibers of the modules (e.g., one of the fibers routed on the substrate or tray of the module). In one example, the ferrule-less fiber optic connector can be a single fiber optical connector. In certain examples, the ferrule-less fiber optic connector can be a multi-fiber connector (e.g., a duplex connector, a 4 fiber connector, a 12 fiber connector, etc.) having a plurality of non-ferrulized optical fibers and each of the fiber alignment devices can receive a plurality of optical fibers.

Each optical pathway through the module can include one or more splices (e.g., fusion splices) between optical fibers, pigtails, and/or fiber stubs. Splices can be located wherever appropriate. For example, splices can be supported on the substrate or be located off the substrate. Splices can be located within the module and/or external to the module.

In one example module in accordance with the present disclosure, the module includes a multi-fiber optical connector such as an MPO-style connector at a fiber optic input to the module. The input may include an input port incorporated in the housing, an input port within the module or an input fiber optic stub or tether that extends outwardly from the module body. A distal end of the MPO-style connector or other multi-fiber connector can include a multi-fiber ferrule adapted to mate within a multi-fiber ferrule of another multi-fiber connector terminating a cable. Optical fibers routed within the module can have first ends received within the fiber alignment devices and second ends terminated at the multi-fiber ferrule (e.g., the MPO ferrule). In other examples, optical fibers routed within the module can have first ends received within the fiber alignment devices and second ends spliced to optical fibers terminated at the multi-fiber ferrule (e.g., the MPO ferrule). Fibers extending proximally from the multi-fiber connector at the input can be ribbonized and the optical fibers can be fanned-out within the module and routed to the fiber alignment devices. In another example module in accordance with the present disclosure, optical connections at the module input can be provided by one or more multi-fiber alignment devices adapted for optically coupling non-ferrulized optical fibers. Examples of such multi-fiber alignment devices are disclosed in PCT Publication No. WO2018/037078 (hereinafter, "the '078 publication"), and PCT Publication No. WO2016/043922, the contents of which applications are hereby incorporated by reference in their entirety.

Numerous optical fiber alignment devices for aligning non-ferrulized optical fibers are described herein and/or incorporated herein by reference. In general, an optical fiber alignment device for aligning non-ferrulized optical fibers can include a housing having an axial bore therethrough adapted to position non-ferrulized optical fibers that are to be connected to each other within the device into sufficiently precise optical alignment for optical transmission. In some examples, the bore is closely toleranced to the diameters of the fibers to be optically coupled together. In some examples the housing includes a biasing mechanism (e.g., elastic cantilever arms, springs, spring-biased balls, etc.), and the bore includes a groove, the biasing mechanism adapted to urge the fibers into the groove. In still further examples, the optical fiber alignment device can include other features, such as balls and/or rods positioned within the housing to urge the fibers into the proper positioning within the alignment device. The optical fiber alignment devices incorporated into the modules of the present disclosure are not limited to any specific embodiment or embodiments.

In some examples, each fiber alignment structure includes a body having a cavity disposed between a proximal port and a distal port. An optical fiber of the module enters the proximal port of the body. The end of a non-ferrulized fiber of a ferrule-less connector terminating a connecting cable can be received at a distal portion of the alignment device. Within the body the non-ferrulized optical fibers are co-axially aligned. In some examples, the non-ferrulized end of the module fiber is fixed (e.g., with a fixing substance such as an adhesive such as epoxy or a mechanical fixation structure such as a crimp, a heat shrink sleeve, a fastener, a clamp or like structures) within the proximal portion of the alignment device. In some examples, the fixing substance can have a refractive index that matches or approximately matches that of the optical fiber core. A connector port-defining structure can house the fiber alignment device. The connector port-defining structure can define a connector port adapted to receive the ferrule-less fiber optic connector such that the non-ferrulized optical fiber of the ferrule-less connector is received in the distal port of the alignment device when the ferrule-less fiber optic connector is inserted in the connector port. In other examples, the module fibers may not be fixed within their corresponding optical fiber alignment devices. In such examples, a fiber take-up region may be provided for allowing the optical fibers of the module to be pushed back and slightly buckled when an optical connection is made with one of the ferrule-less fiber optic connectors.

In accordance with various aspects of the present disclosure, one example optical fiber module comprises: a shell defining an interior volume, at least one flexible or rigid substrate disposed in the interior volume and supporting a plurality of optical fibers, and one or more optical fiber alignment structures for aligning non-ferrulized optical fibers. One or more of the one or more alignment structures can include a body and/or an alignment device and/or a fiber fixing substance and/or a fiber index matching substance. The module may also include one or more ports and/or a multi-fiber optical connectors and/or single fiber optical connectors and/or one or more passive optical power splitters and/or one or more optical multiplexers (e.g., wavelength division multiplexers) and/or one or more fiber fan out devices and/or one or more fiber organizing devices.

A process for manufacturing a module in accordance with the present disclosure can include one or more of the following steps that need not be performed in the following sequence: providing a shell defining an interior volume;

and/or terminating a plurality of fiber stubs in a MPO connector or a multi-fiber ferrule-less alignment system; and/or depositing and/or supporting optical fibers in a flexible or rigid substrate; and/or splicing substrate-supported optical fibers to fiber stubs; and/or coupling ferrule-less alignment structures to a substrate; and/or terminating ends of substrate-supported or to-be substrate-supported fibers in ferrule-less alignment structures; and/or affixing ends of substrate-supported or to-be substrate-supported fibers within ferrule-less fiber alignment structures; and/or coupling connector port-defining structures to ferrule-less alignment structures and/or providing ferrule-less connectorized optical cables; and/or inserting ferrule-less connectors into connector ports and optically aligning fiber ends supported in the ferrule-less connectors with ends of substrate-supported fibers within fiber alignment structures; and/or providing a fiber index matching substance within fiber alignment devices housed in fiber alignment device mounting housings.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 9 is a front view of the assembly of FIG. 8.

FIG. 10A is a cross-sectional view of the assembly of FIG. 8 along the line A-A in FIG. 9.

DETAILED DESCRIPTION

Figure 1:
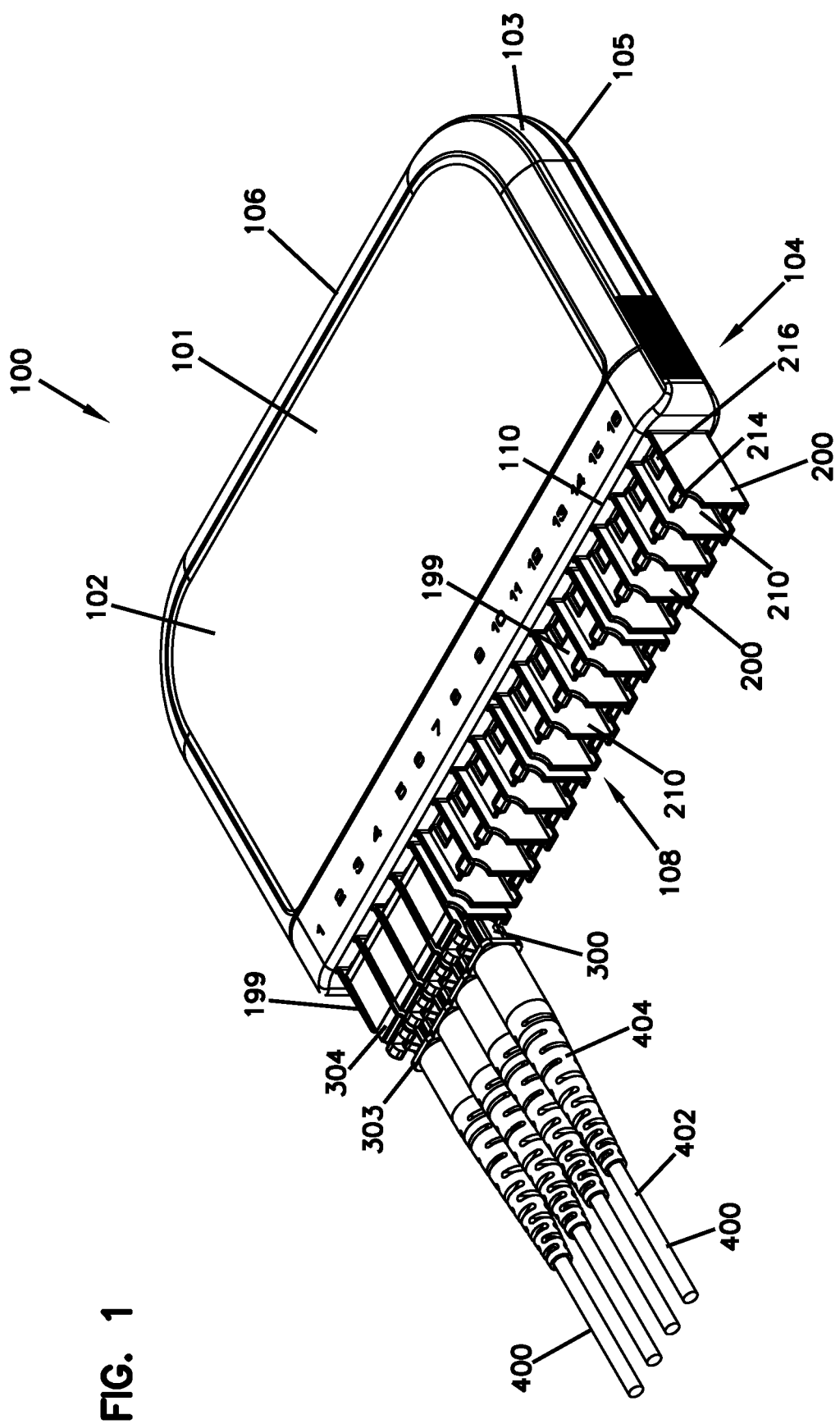
FIG. 1 is a top, front, perspective view of an example telecommunications module in accordance with the present disclosure, a plurality of cable assemblies terminated with ferrule-less connectors being shown coupled to the telecommunications module.

The present disclosure is directed generally to fiber optic modules including fiber optic circuits. The circuits can include rigid or flexible substrates. In certain exemplary applications, the circuits of the present disclosure are designed to relay or route multiple fibers which terminate at a rear connector, such as a multi-fiber connectors (e.g., an MPO style connector) or one or more multi-fiber fiber alignment devices for aligning non-ferrulized optical fibers, positioned at a generally rear portion of the module, to one or more fiber alignment devices for aligning non-ferrulized optical fibers positioned at a generally front portion of the module.

One or more (typically, multiple) optical fibers can be supported on the substrate, which can be, but need not be, planar. In the case of a flexible substrate, the substrate can be made of a material such as a Mylar™ or other flexible polymer substrate. Although specific embodiments herein depict and describe planar substrates, it should be appreciated that other substrate configurations, e.g., in which a substrate routes fibers in and/or across multiple planes are also contemplated. Commonly, although not necessarily, one end face of each fiber is disposed at or beyond one end of the flexible optical circuit substrate and the other end face of each fiber is disposed at or beyond another end (e.g., an opposing end) of the flexible optical circuit substrate. In some examples, the fibers can extend past the end of the flexible substrate for purposes of connectorization, splicing or for interfacing with a fiber alignment device for aligning non-ferrulized optical fibers. In some examples, the fibers can be two or more fibers spliced together.

Supporting the optical fibers on the substrate essentially comprises one or more fibers being routed on the substrate. Once routed or during the routing process, in some examples, the fibers are secured to the flexible substrate, e.g., with an adhesive and/or other material which can pre-applied and adhered to the substrate and/or cured on the substrate.

The modules and circuits of the present disclosure include the connectorization, aligning, and/or splicing of fiber ends. To improve optical transmission, fiber ends are often processed. Such processing can include any suitable treatment of fibers that can be performed to enhance optical transmission, splicing, connectivity, and the like. To ready fiber ends for processing, the fibers are first stripped of their coating layers, and then cleaved. The fiber ends are then cleaned/polished. The cleaning/polishing process is designed to smooth out any imperfections in the fiber face to enhance optical transmission. In some examples, processing of the fiber ends includes a mechanical polishing of the fiber ends which can be performed, e.g., with an abrasive slurry and/or abrasive pads. In other examples, cleaning, shaping, re-flowing and other types of processing of the fiber ends is performed by an energy source. Examples of such energy sources include but are not limited to laser treatment, plasma treatment, corona discharge treatment, heat treatment, and electric arc treatment. Different fiber end processing techniques and methods are disclosed in U.S. Patent Application Publication No. 2014/0124140, the contents of which are hereby incorporated by reference in their entirety.

In the following description, reference is made to the accompanying drawings, which form a part hereof, and in which is shown by way of illustration specific embodiments which may be practiced. Throughout the drawings, like reference numbers refer to like features.

Figure 2:
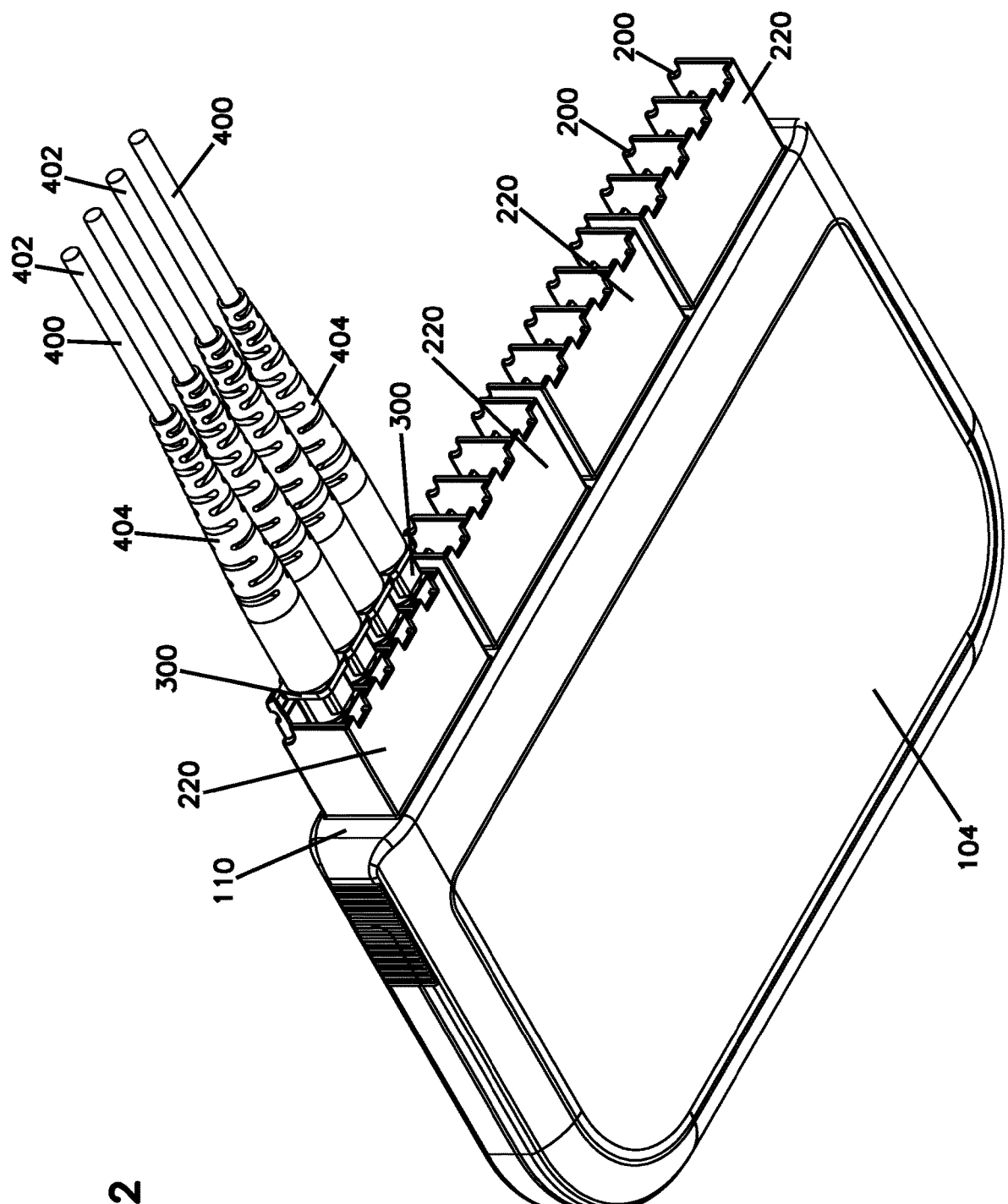
FIG. 2 is a bottom, front, perspective view of the module, cable assemblies, and connectors of FIG. 1.
Figure 3:
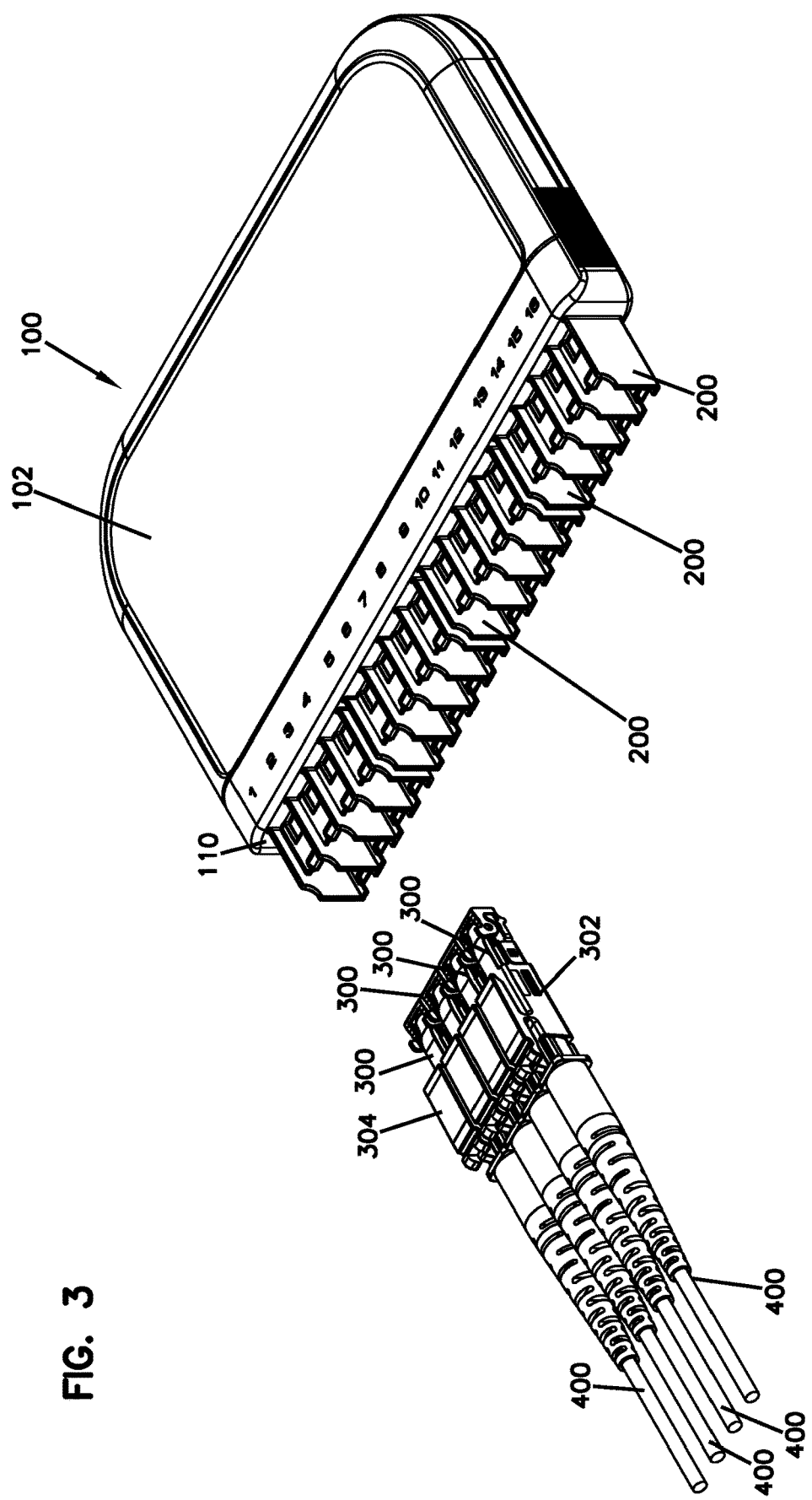
FIG. 3 is a further view of the module of FIG. 1 with the connectors and cable assemblies detached from the module.
Figure 4A:
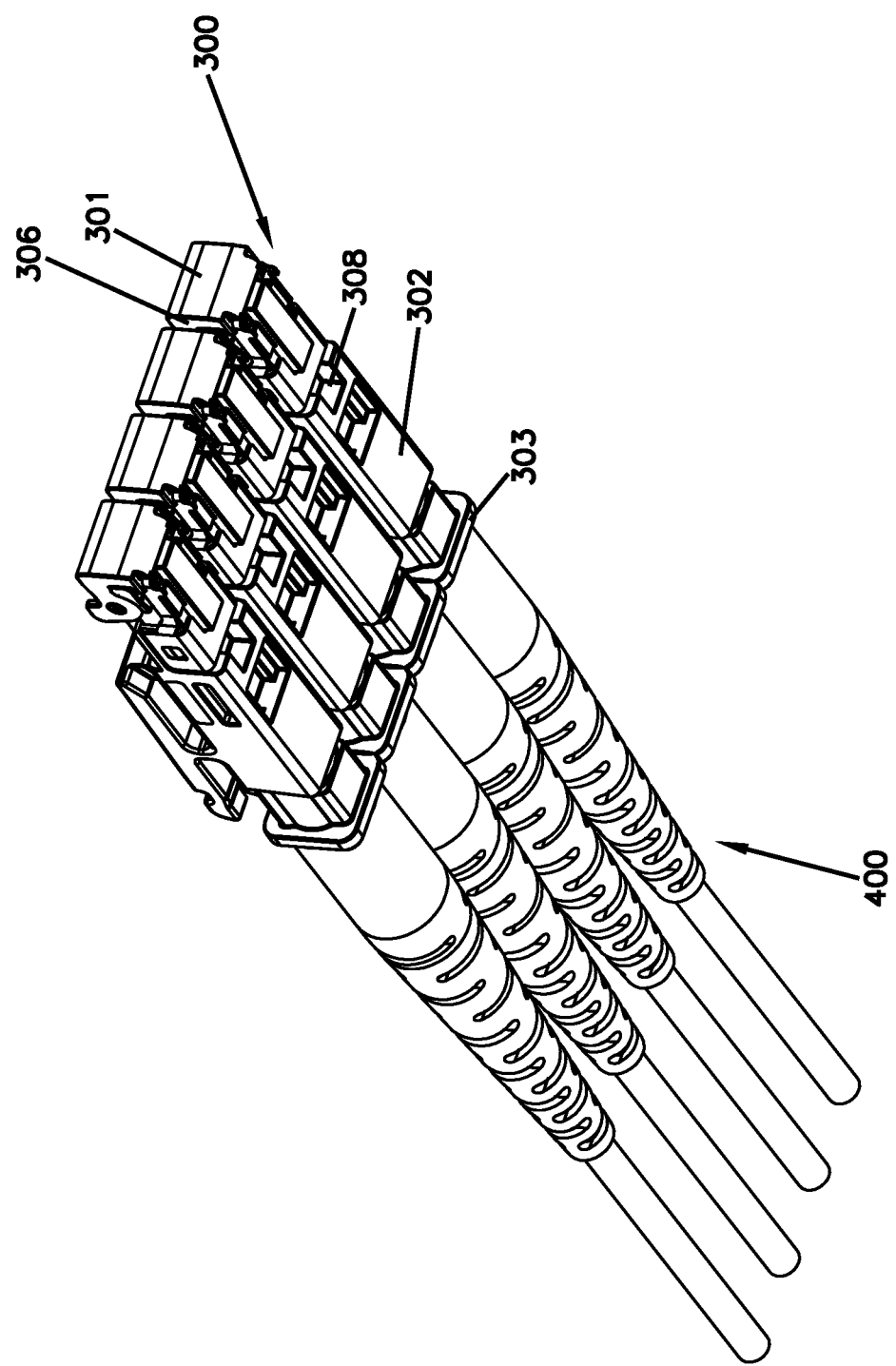
FIG. 4A is a bottom, perspective view of the cable assemblies and connectors of FIG. 1 in a shutter-closed configuration.
Figure 4B:
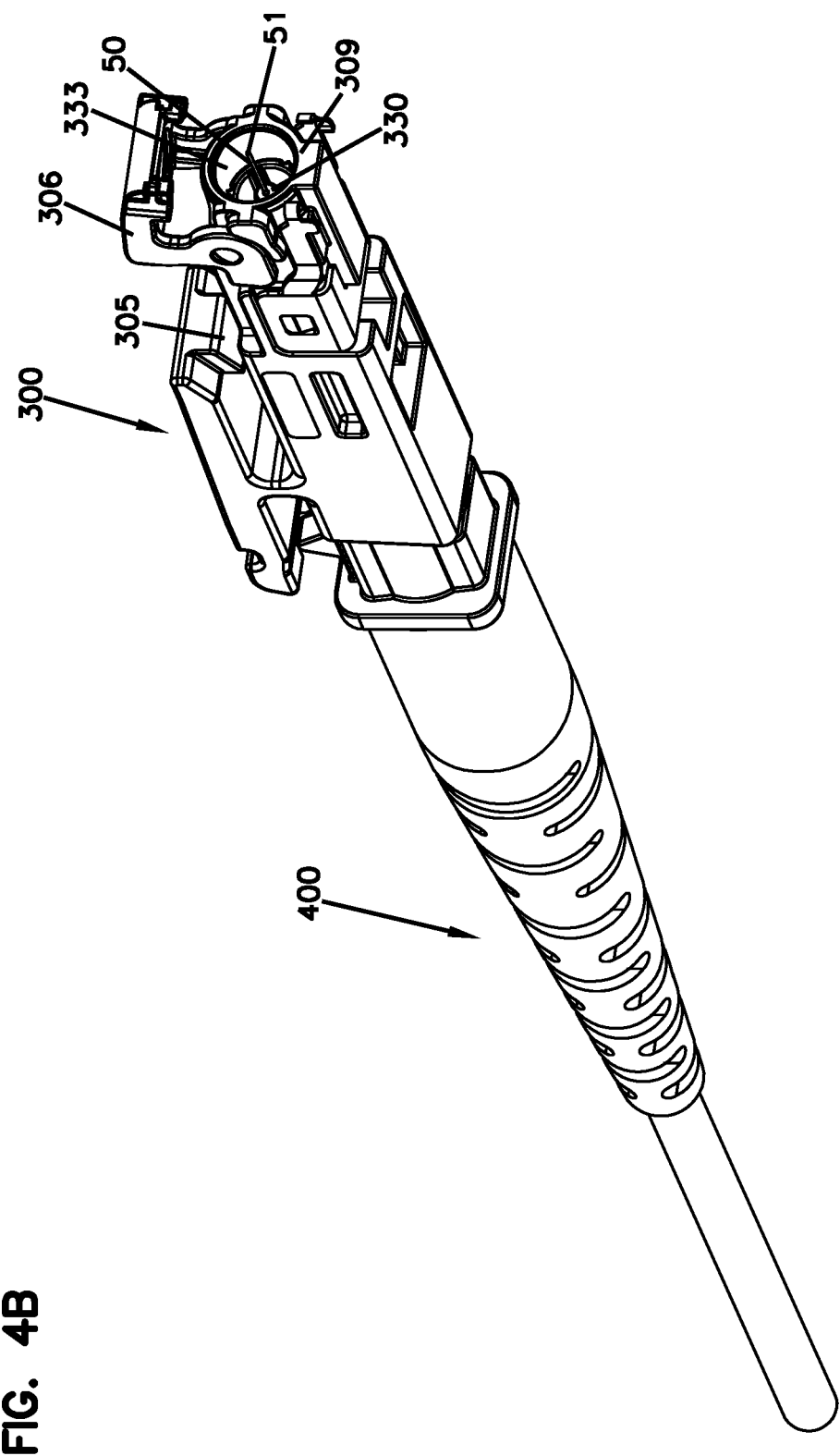
FIG. 4B is a front, bottom, perspective view of one of the connectors of FIG. 4A in a shutter-open configuration.
Figure 5:
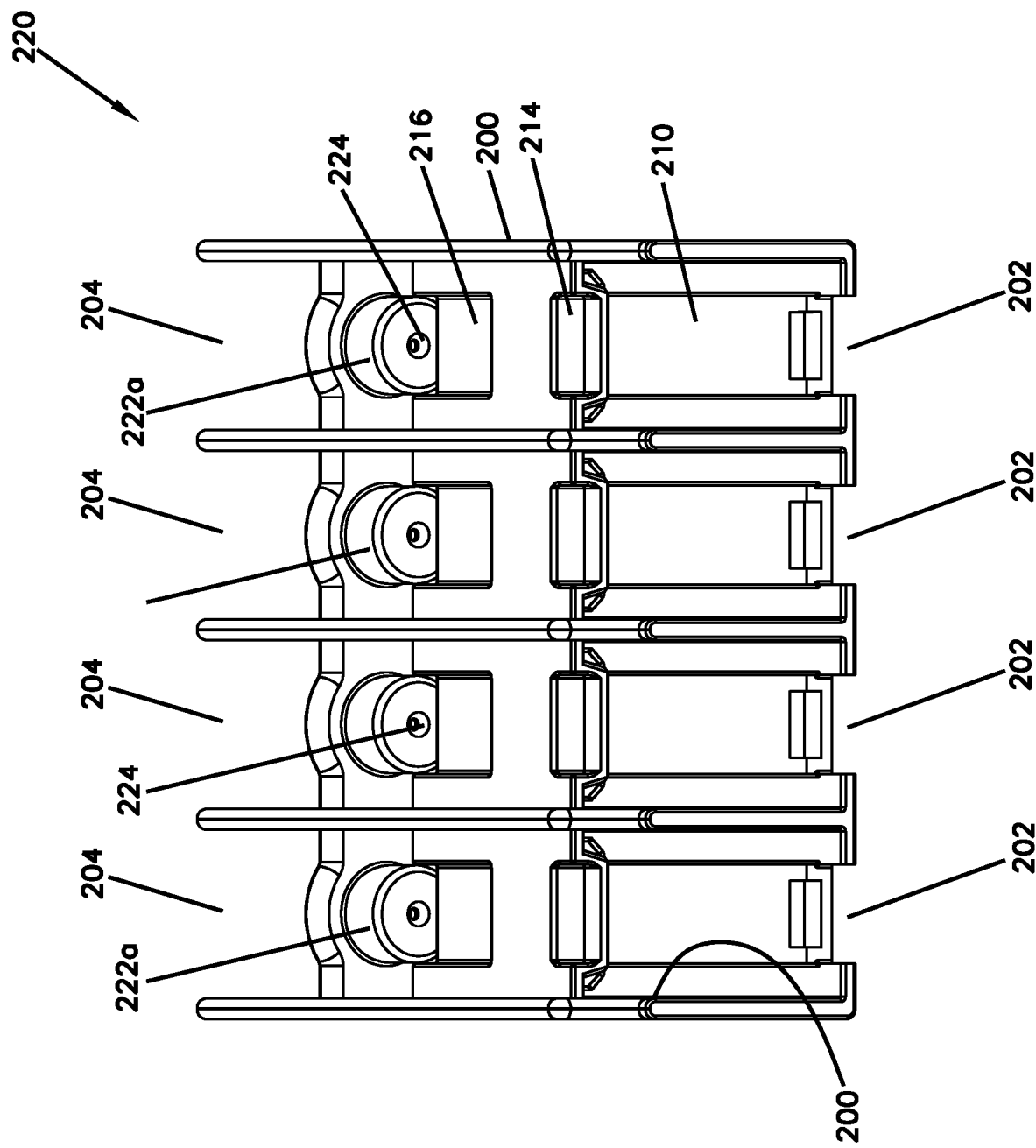
FIG. 5 is a perspective view of an example block defining a plurality of connector ports in accordance with the present disclosure, the block can form a distal portion of a fiber alignment device mounting housing.

FIG. 1 is a top, front, perspective view of an example module 100 in accordance with the present disclosure. As depicted, example cable assemblies 400 terminated with ferrule-less connectors 300 are shown dematably coupled with demateable fiber optic connection locations of the module. FIG. 2 is a bottom, front, perspective view of the module 100, cable assemblies 400, and connectors 300 of FIG. 1. FIG. 3 is a further view of the module 100 of FIG. 1 with the connectors 300 and cable assemblies 400 detached from the module 100. FIG. 4A is a bottom, perspective view of the cable assemblies 400 and connectors 300 of FIG. 1 in a shutter-closed configuration. FIG. 4B is a front, bottom perspective view one of the connectors 300 of FIG. 4A in a shutter-open configuration. FIGS. 4A and 4B will be referred to, collectively, as FIG. 4. FIG. 5 is a perspective view of an example distal housing portion 220 that forms a distal portion of a fiber alignment device mounting housing 199 in accordance with the present disclosure.

Referring to FIGS. 1-5, the module 100 has a top 102, a bottom 104, a back 106 and a front 108. As used herein, terms such as "top," "bottom," "front," "back" or "rear," etc., are used as a convenience to refer to the relative positioning of features in the figures; these and similar terms do not limit how the module or other components can be oriented or situated in use.

The module 100 includes a shell 101 that defines a closed interior volume. However, the module need not be fully enclosed. For example, in other embodiments a tray having an open configuration such as an open top can be used rather than the enclosed shell. The shell 101 can be formed of multiple pieces, such as the pieces 103 and 105 which are mateable (e.g., via snap or interference fit) and demateable to selectively access and close off access to the interior volume of the module. The junction of the pieces 103 and 105 can include a seal to protect the interior volume from contamination.

A partition 110 divides the interior volume of the module 100 from exterior components forward of the partition 110, the partition including a plurality of output ports receiving fiber alignment device mounting housings 199 corresponding to the demateable fiber optic connection locations of the module. One or more additional ports (such as port 140 shown in FIG. 17) can be provided elsewhere in the shell to provide access to the interior volume for, e.g., a multi-fiber connectorized input cable.

A series of demateable fiber optic connection locations including fiber alignment device mounting housings 199 are stationed along the partition 110. The fiber alignment device mounting housings 199 can be configured for housing (e.g., containing, holding) one or more fiber alignment devices 650 (see FIG. 12) and for mounting the fiber alignment devices 650 in position relative to a substrate, tray, optical circuit, shell or other structure of the module. The fiber alignment devices 650 can be configured to co-axially align non-ferrulized optical fibers to provide optical couplings therebetween. Each housing 199 can be a singular unit coupled to an optical circuit disposed within the interior volume of the module. Alternatively, at least some of the housings 199 can include distal housing portions 220 (e.g., connector port defining structures) configured as blocks. Each block is a unitary construction defining a plurality of connector port-defining structures 200 defining connector ports 210. In FIG. 2, four distal housing portions 220 are shown protruding forwardly from the partition 110, and each of the distal housing portions 220 includes four connector ports 210 each corresponding to a demateable fiber optic connection location, though it should be appreciated that distal housing portions 220 can include any desired number of connector ports 210, such as 2, 3, 5, 6, 7, 8, 9, 10, 11, 12, 13, 14, 15, 16, or more, or separate distal housing portions each defining an individual/single connector port can be used. Organizing the connector ports in blocks can help increase the port density.

Figure 10B:
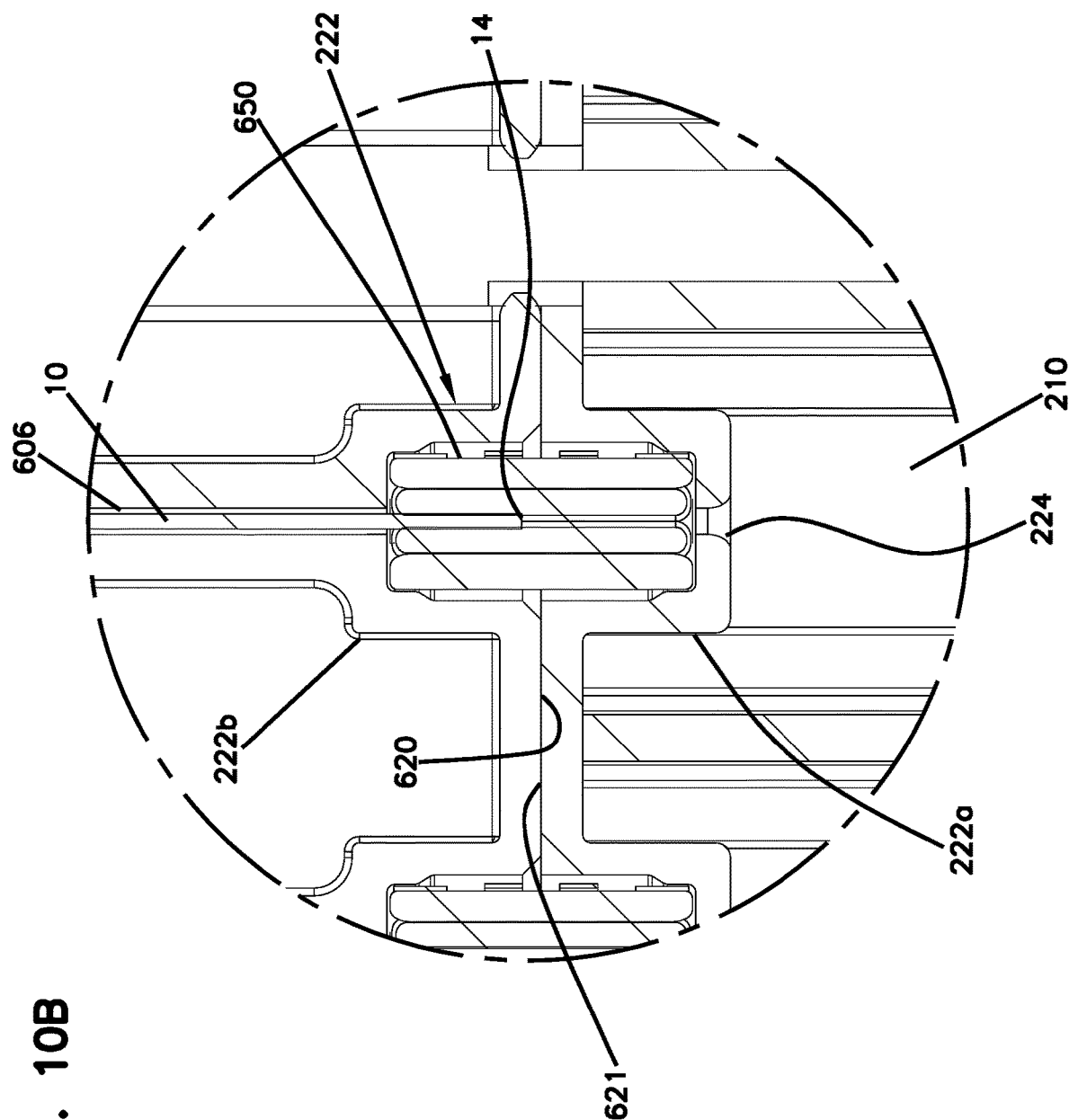
FIG. 10B is an enclosed view of a portion of FIG. 10A.

As shown in FIG. 5, the distal housing portion 220 includes a distal end 202 and a proximal end 204. The proximal end 204 of each distal housing portion 220 is configured to mechanically couple with a distal end of a corresponding proximal housing portion 600 such that the distal and proximal housing portions 220, 600 cooperate to define one of the fiber alignment device mounting housings 199 (see FIGS. 6, 10A and 11). The fiber alignment devices 650 are captured and retained within internal cavities/chambers 201 cooperatively defined by the distal and proximal housing portions 220, 600 (see FIGS. 10A and 10B). For example, distal ends of the fiber alignment devices 650 are received within portions of the cavities defined by the distal housing portion 220 and proximal ends of the fiber alignment devices 650 are received within portions of the cavities defined by the proximal housing portions 600. A proximal end of the proximal housing portion 600 is secured to a substrate, tray or like structure of the module whether by adhesive or by any mechanical fastening arrangement (e.g., fasteners, latches, a snap-fit structure, fastening arms, or like structures).

Each connector port-defining structure 200 defines one of the connector ports 210 (FIG. 1). The connector ports 210 are each configured for receiving a ferrule-less fiber optic connector (e.g., a connector 300). Each connector port 210 axially aligns with a corresponding one of the fiber alignment devices 650 housed within the fiber alignment device mounting housing 199. In certain examples, each port defining structure 200 can include one or more connector engaging elements, such as ramp 214 and notch 216 to lockingly engage a connector. The position of the connector engaging elements will be dependent upon the configuration of the mating connector and can be on the top, bottom or sides of the connector ports. Example connector engaging elements can include elastic latches and/or latch receivers.

The cavities 201 of the fiber alignment device mounting housings 199 which contain the fiber alignment devices 650 can be cylindrical and can be defined by sleeves 222 (see FIG. 10A) cooperatively formed by the distal and proximal housing portions 220, 600. For example, the distal housing portions 220 can include sleeve portions 222a and the proximal housing portions 600 can include sleeve portions 222b. Opposite axial ends of the sleeves 222 define co-axially aligned fiber openings (e.g., fibers bores, fiber passages, etc.) for allowing non-ferrulized optical fibers (e.g., bare optical fibers) to be inserted into the sleeves 222 and into the fiber alignment devices 650 contained therein. Co-axial alignment and optical coupling takes place within the fiber alignment devices 650 contained in the sleeves 222. The distal housing portions 220 define fiber openings in the form of axial bores 224 that are in communication with the connector ports 210. When a ferrule-less fiber optic connector 300 is inserted into one of the connector ports 210, a non-ferrulized optical fiber of the fiber optic connector 300 is directed through the corresponding axial bore 224 and into the corresponding fiber alignment device 650. The axial bores 224 can be chamfered/tapered and can be configured to guide the non-ferrulized optical fibers of the ferrule-less connectors 300 into the fiber alignment devices 650 as the fiber optic connectors 300 are inserted into the connector ports 210.

Each of the connectors 300 terminates a cable assembly 400. Each cable assembly 400 includes an optical cable 402 (distally truncated in the figures) carrying one or more optical fibers 50 having an end 51 (e.g., a non-ferrulized end). Each connector 300 includes a proximal end 301, a distal end 303, and a body 302. A flexible latch 304 extending from the body 302 can include a tab/catch 305 (see FIG. 4B) for fitting within the notch 216 above the port 210 to thereby lock the connector 300 in the connector port 210 of the connector port-defining structure 200.

The body 302 of the connector 300 defines an interior bore through which the non-ferrulized fiber end 51 (e.g., a bare fiber portion) of the fiber 50 of the cable 402 is inserted and in which the stripped fiber 50 is secured. A strain relief member 404 (e.g., a tapered boot) can be secured to a distal portion of the connector 300 and can protect the fiber within from stresses resulting from bending. Each connector can include a shutter 306, which can be pivotally mounted at the proximal end of the connector to selectively protect the fiber within from contamination, and/or to enable connection of the fiber within to another fiber (i.e., by lifting the shutter 306).

That is, the shutter 306 is preferably movable relative to the body 302 between a first position (shown in FIG. 4A) where the shutter 306 covers an open proximal side of the body 302 and a second position (shown in FIG. 4B) where the shutter 306 does not cover the open proximal side of the body 302. In certain examples, the shutter 306 is pivotally connected to the body 302 such that the shutter 306 can pivot relative to the body 302 between the first and second positions. The shutter 306 is designed to protect the end of the optical fiber 50 when the fiber optic connector 300 is not being used to make an optical connection.

When it is desired to make an optical connection using the fiber optic connector 300, the fiber optic connector 300 can be inserted into one of the connector ports 210 of the fiber alignment device mounting housing 199. In some examples, as the fiber optic connector 300 is inserted into the connector port 210, the shutter 306 moves from the first position to the second position to expose and provide access to the end 51 of the optical fiber 50 which, in some examples, protrudes beyond the open proximal side 309 of the body 302. With the end of the optical fiber exposed, the optical fiber 50 can slide into the fiber alignment device 650 corresponding to the connector port 210, which co-axially aligns the optical fiber with an optical fiber routed at least partially through the module 100. It will be appreciated that other types and configurations of ferrule-less connectors can also be used. Such connectors may include or not include pivotal shutters.

Figure 6:
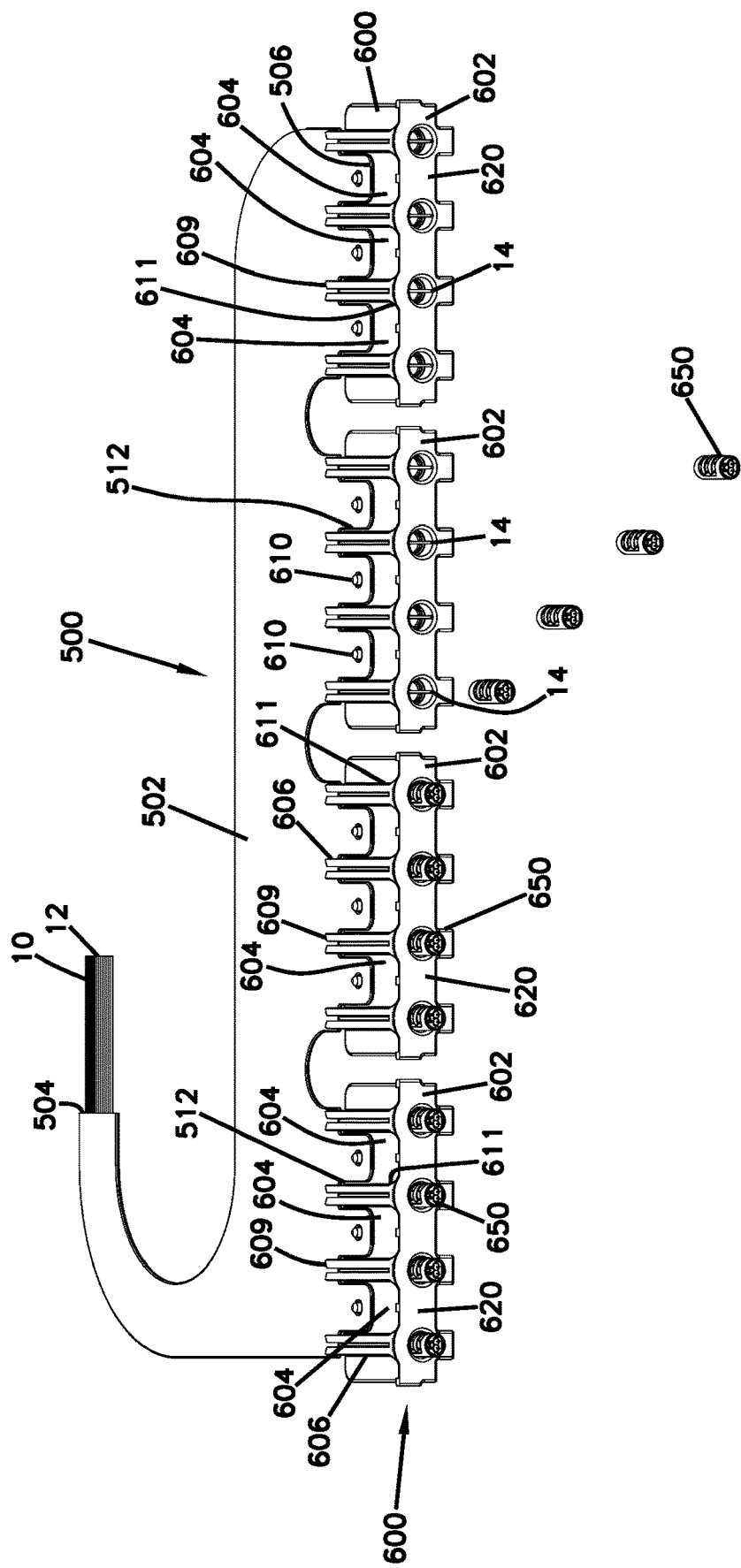
FIG. 6 is a perspective view of an example optical circuit and a plurality of example fiber alignment devices, some of which are shown in a partially exploded view exploded from corresponding proximal portions of alignment device mounting housings, in accordance with the present disclosure.
Figure 7:
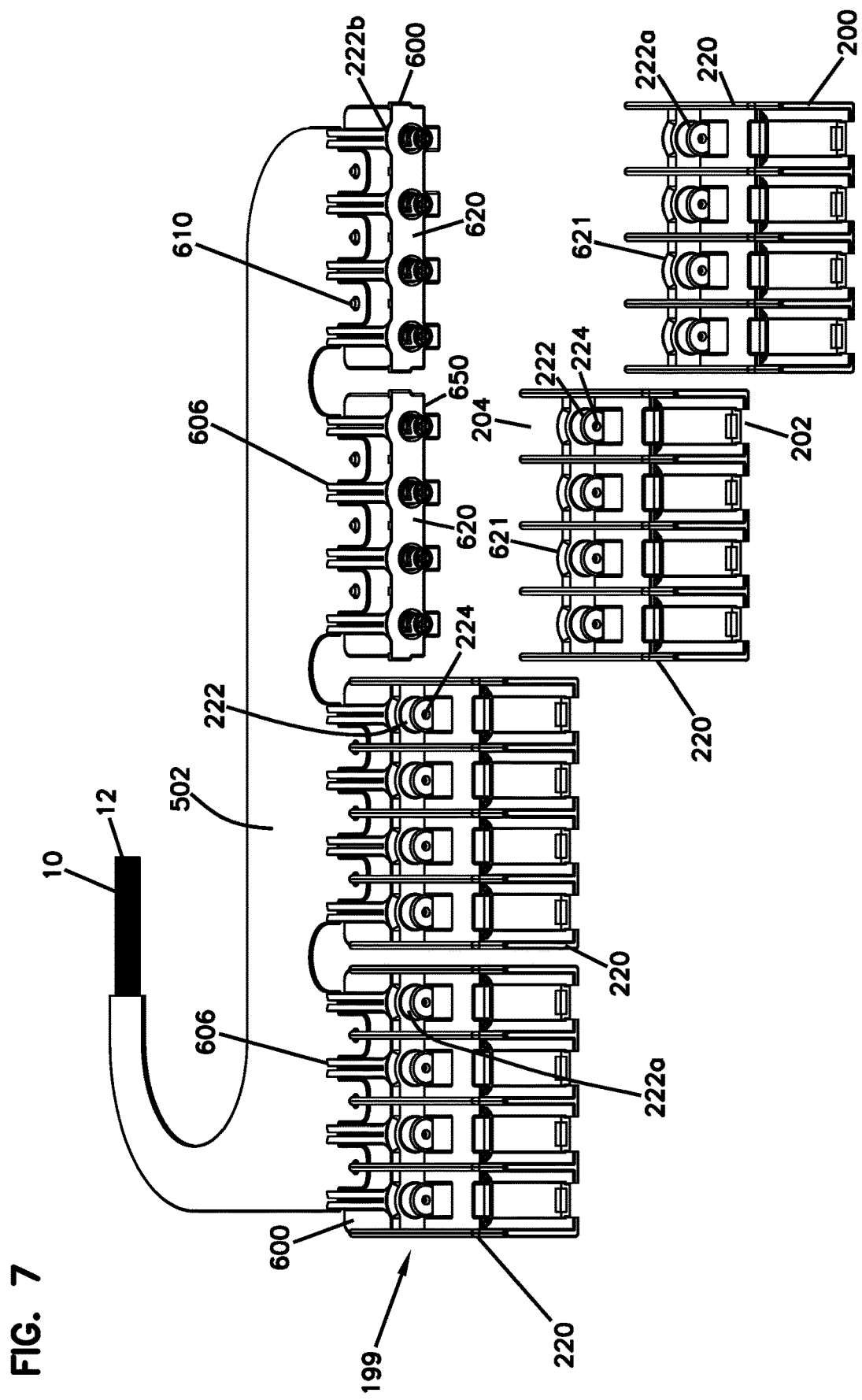
FIG. 7 is a perspective view of the optical circuit and alignment devices of FIG. 6 and port-defining blocks of FIG. 5, wherein some of the blocks are shown coupled to the proximal portions of the fiber alignment device mounting housings such that the fiber alignment devices are housed therein, and some of the blocks are shown exploded from the corresponding proximal portions of the alignment device mounting housings.
Figure 8:
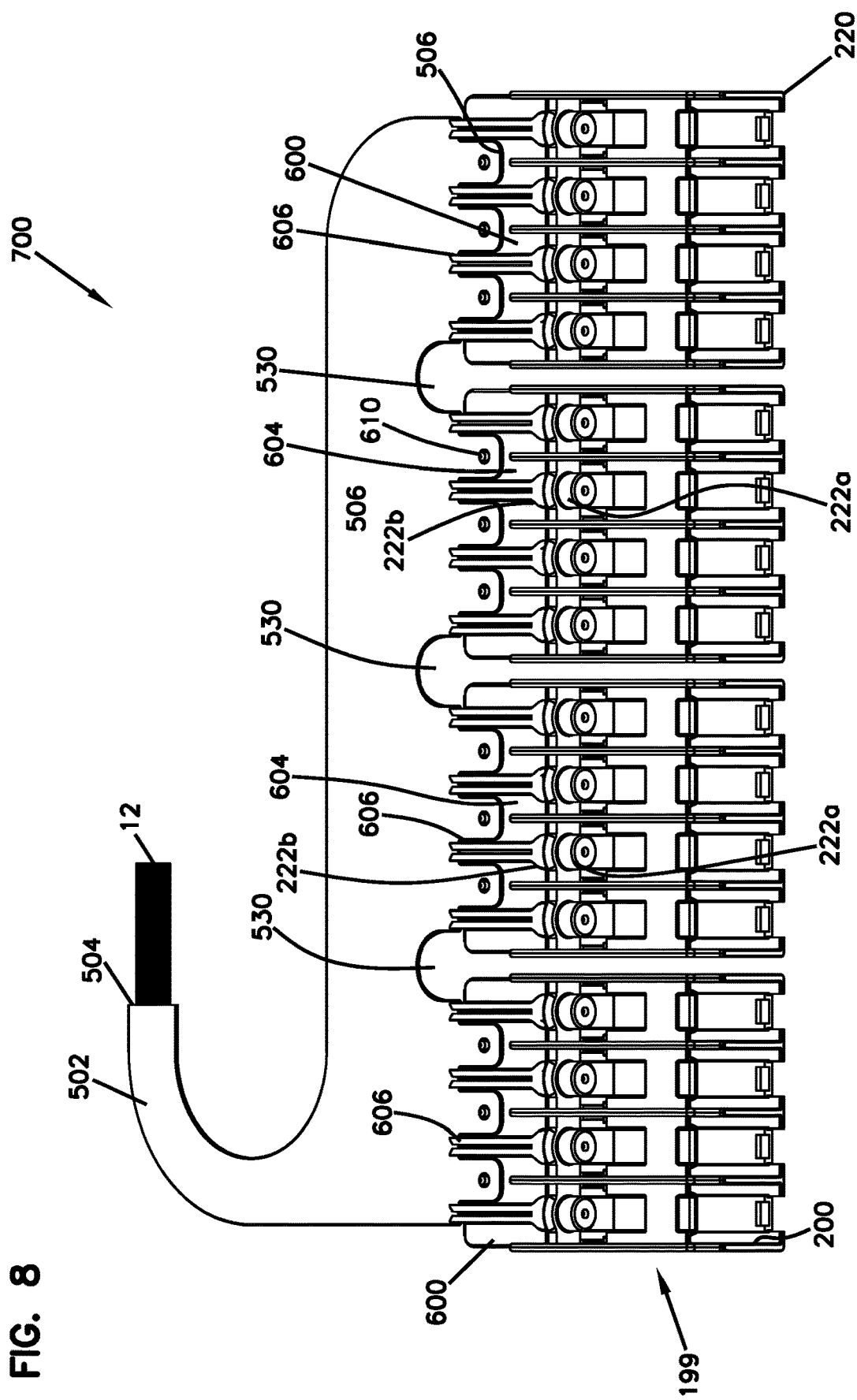
FIG. 8 is a complete assembly of the optical circuit, and the fiber alignment device mounting housings of FIG. 7.
Figure 11:
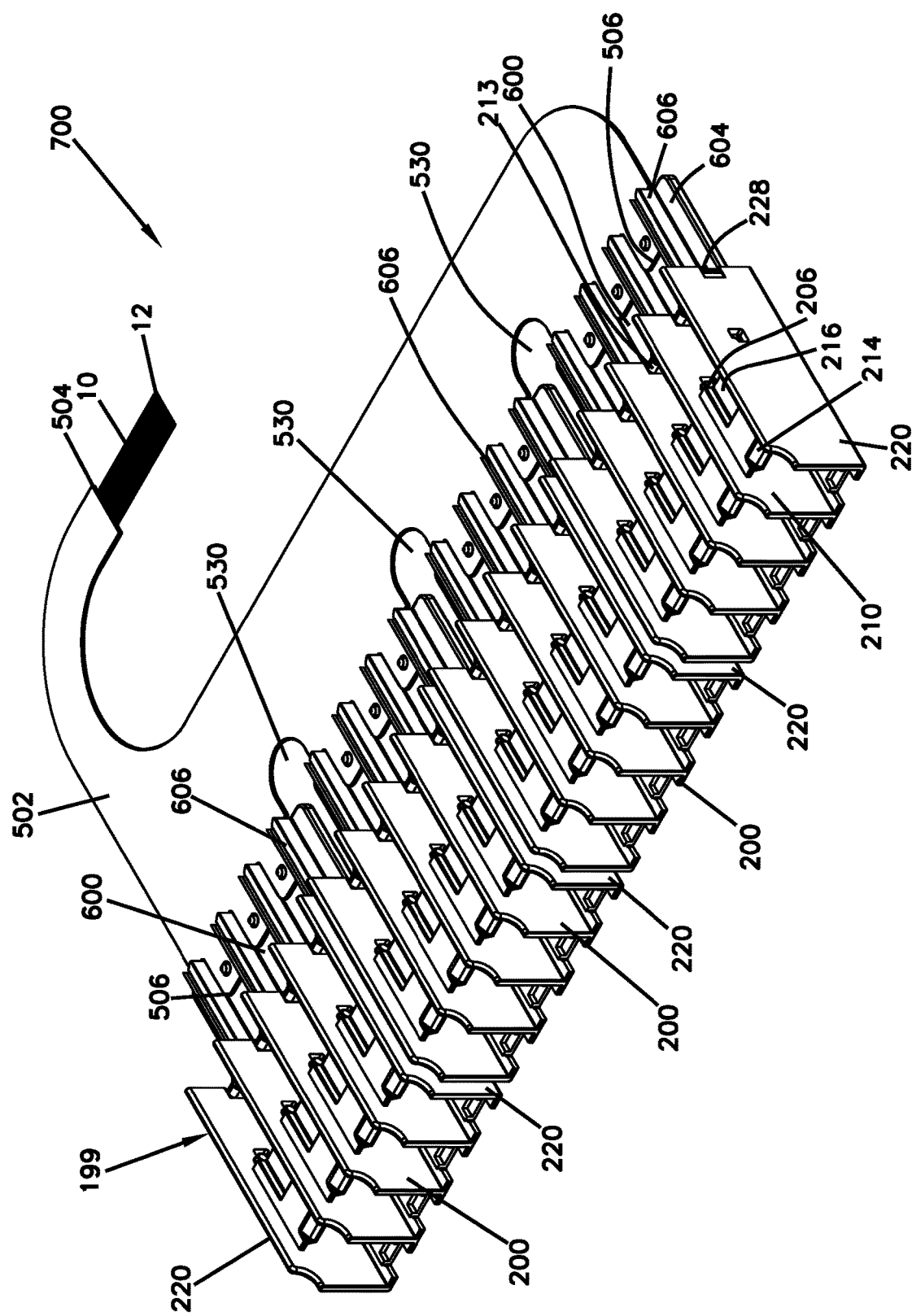
FIG. 11 is a further perspective view of the assembly of FIG. 8.

FIG. 6 is a perspective view of an example optical circuit 500 (e.g., an optical signal conveyance device including one or more optical pathways (e.g., optical waveguides such as optical fibers) that extend along certain routes and a plurality of example proximal housing portions 600 of the fiber alignment device mounting housings 199, some of which are shown in a partially exploded view, in accordance with the present disclosure. FIG. 7 is a perspective view of the optical circuit 500 and proximal housing portions 600 of FIG. 6 and distal housing portions 220 of FIG. 2, wherein some of the distal housing portions 220 are shown coupled to corresponding proximal housing portions 600, and some of the distal housing portions 220 are shown not coupled to (exploded from) their corresponding proximal housing portions 220. FIG. 8 is a complete assembly 700 of the optical circuit 500, the proximal housing portions 600, and the distal housing portions 220 of FIG. 7. FIG. 9 is a front view of the assembly 700 of FIG. 8. FIG. 10A is a cross-sectional view of the assembly 700 of FIG. 8 along the line A-A in FIG. 9. FIG. 11 is a further perspective view of the assembly 700 of FIG. 8. It will be appreciated that other fiber routing schemes and layouts as well as other substrate shapes other than those specifically shown can also be used.

Referring to FIGS. 6-11, the optical circuit 500 includes a substrate 502 supporting a plurality of optical fibers 10. The substrate 502 can be flexible or rigid. First ends 12 of the optical fibers 10 can be terminated (or spliced to fiber stubs that are terminated) at, e.g., a MPO style connector that includes a multi-fiber ferrule, or a multi-fiber alignment device for aligning non-ferrulized optical fibers, or to an optical chip such as a passive optical splitter or wavelength division multiplexer. Portions of the fibers 10 can be supported on the substrate 502, the fibers 10 passing from a first end 504 of the substrate 502 to a second end 506 of the substrate 502 as they fan out on the substrate 502. If optical splices are used, the splices can be located on the substrate 502 and/or off the substrate 502. Each of the second ends 14 of the fibers 10 is terminated (or spliced to a stub that is terminated) in one of the alignment devices 650 of the demateable fiber optic connection locations corresponding to the fiber alignment device mounting housings 199.

The proximal housing portions 600 can be organized as blocks 602. In the example shown, there are four blocks 602, each at least partially containing four of the fiber alignment devices 650, though different numbers of blocks and different numbers of fiber alignment devices per block can be used. A proximal housing portion 600 can include an optional substrate coupling portion 604, optional fiber feeding portions 606, sleeve portions 222b, and alignment devices 650 partially contained in the portions of the cavities 201 defined by the sleeve portions 222b. The fiber feeding portions 606 can include passages that extend from the substrate to the sleeve portions 222b such that optical fibers 10 from the substrate can be routed from the substrate through the passages and into the sleeves 222 where ends of the fibers 10 are received within the fiber alignment devices 650 contained within the sleeves 222. In cases where the optical fibers 10 are not fixed within the fiber alignment devices 650 (e.g., by adhesive or mechanically), the passages can be configured to define a buckling region for allowing the optical fibers 10 to buckle within the passages when an optical connection is mate with a fiber 50 of a mating fiber optic connector 300 (i.e., during optical connections the fibers 10 can be pushed back and buckled with the elasticity of the buckled fiber assisting in maintaining contact between the optical fibers 10, 50).

The substrate coupling portion 604 can include one or more fasteners, e.g., pegs 610 for engaging with complementary features of the substrate 502 to thereby couple the substrate and the alignment blocks 602. In other examples, the fiber alignment device mounting housings 199 may be attached to a shell of the module rather than the substrate and can include appropriate structure for making such an attachment.

The fiber feeding portion 606 defines a channel or passage into which an optical fiber is inserted. In some examples, each fiber feeding portion 606 can be supported in a notch 512 of the substrate 502, such that most or all of the fiber within the fiber feeding portion 606 is not supported by the substrate 502. A proximal end 609 of each fiber feeding portion is supported on the substrate 502. A distal end 611 of each fiber feeding portion 606 opens into the cavity 201 defined by the sleeve portion 222b. In other configurations, the fiber feeding portion 606 may not be an extended passage and can be configured as a sleeve entrance opening similar to the axial bores 224 defined by the sleeve portion 222a of the distal housing portion 220 such that the sleeves have symmetrical ends. Other sleeve configurations can also be used.

Each cavity 201 can contain an alignment device 650. Each fiber end 14 is fed through the fiber feeding portion 606 and into an alignment device 650. Alternatively, it should be appreciated that fiber stubs can be pre-coupled to alignment devices 650, the alignment devices installed in the alignment cavity 608, and spliced to ends of the fibers 10.

The proximal housing portions 600 can be coupled to the distal housing portions 220 by mechanical interfaces such as snap-fit connections. The snap-fiber interfaces can include latches, latching arms, locking tabs, latch receivers (e.g., openings, notches, shoulders, etc.) or like structures. When coupled together, a distal end face 620 of each proximal housing portion 600 can abut with a corresponding proximal end face 621 of the corresponding distal housing portion 220.

In some examples, the block-style alignment device mounting housings 199 can be spaced apart from one another (e.g., to facilitate access). The optical circuit 500 can be configured to accommodate spaced apart alignment device mounting housings 199 by including gaps 530 in the substrate 502.

Structural modifications to the example circuit 500, including structural differences in substrate, fiber routing, ribbonization of the fibers, and also in the shell 101 may be contemplated in accordance with the disclosures of U.S. Patent Application Publication No. 2015/0253514, the contents of which are hereby incorporated by reference in their entirety.

Figure 12:
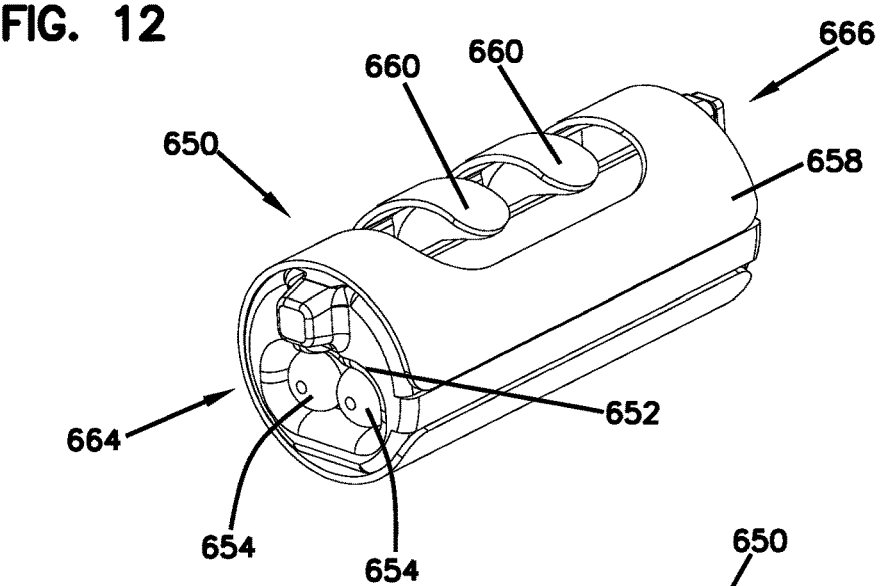
FIG. 12 is a perspective view of one of the alignment devices of FIG. 6.
Figure 13:
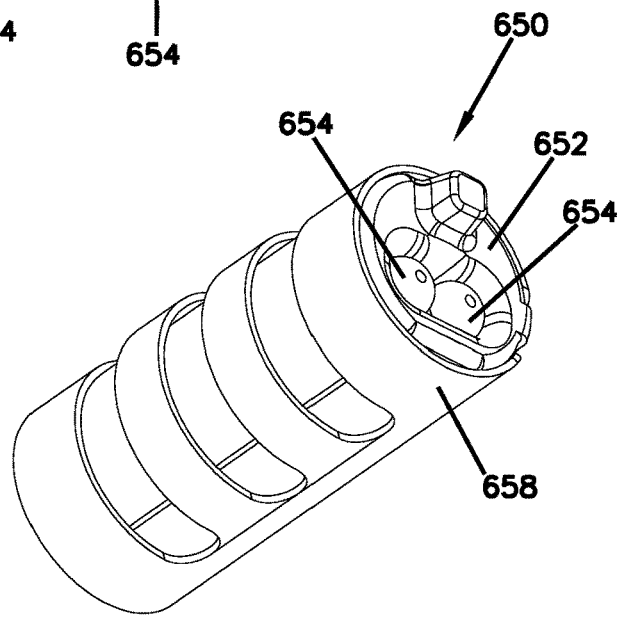
FIG. 13 is a further perspective view of the alignment device of FIG. 12.
Figure 14:
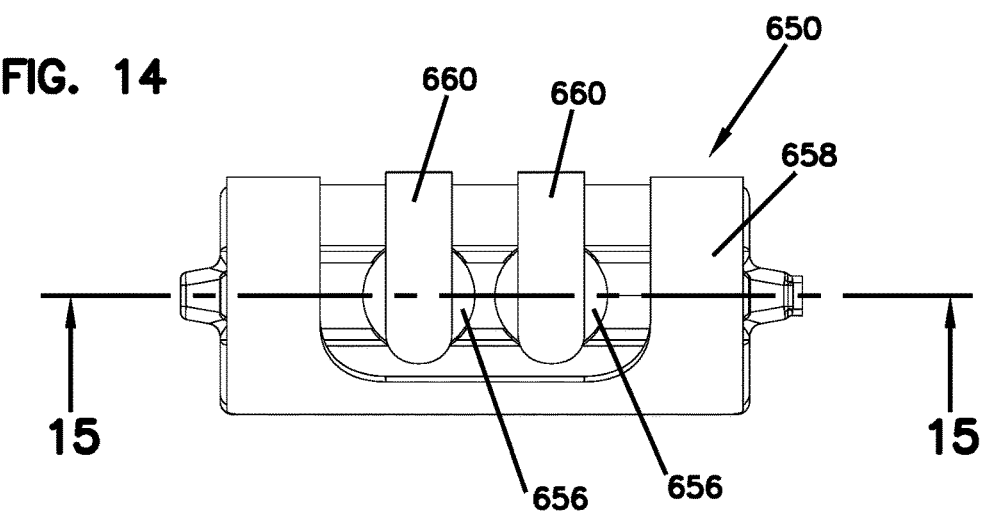
FIG. 14 is a side view of the alignment device of FIG. 12.
Figure 15:
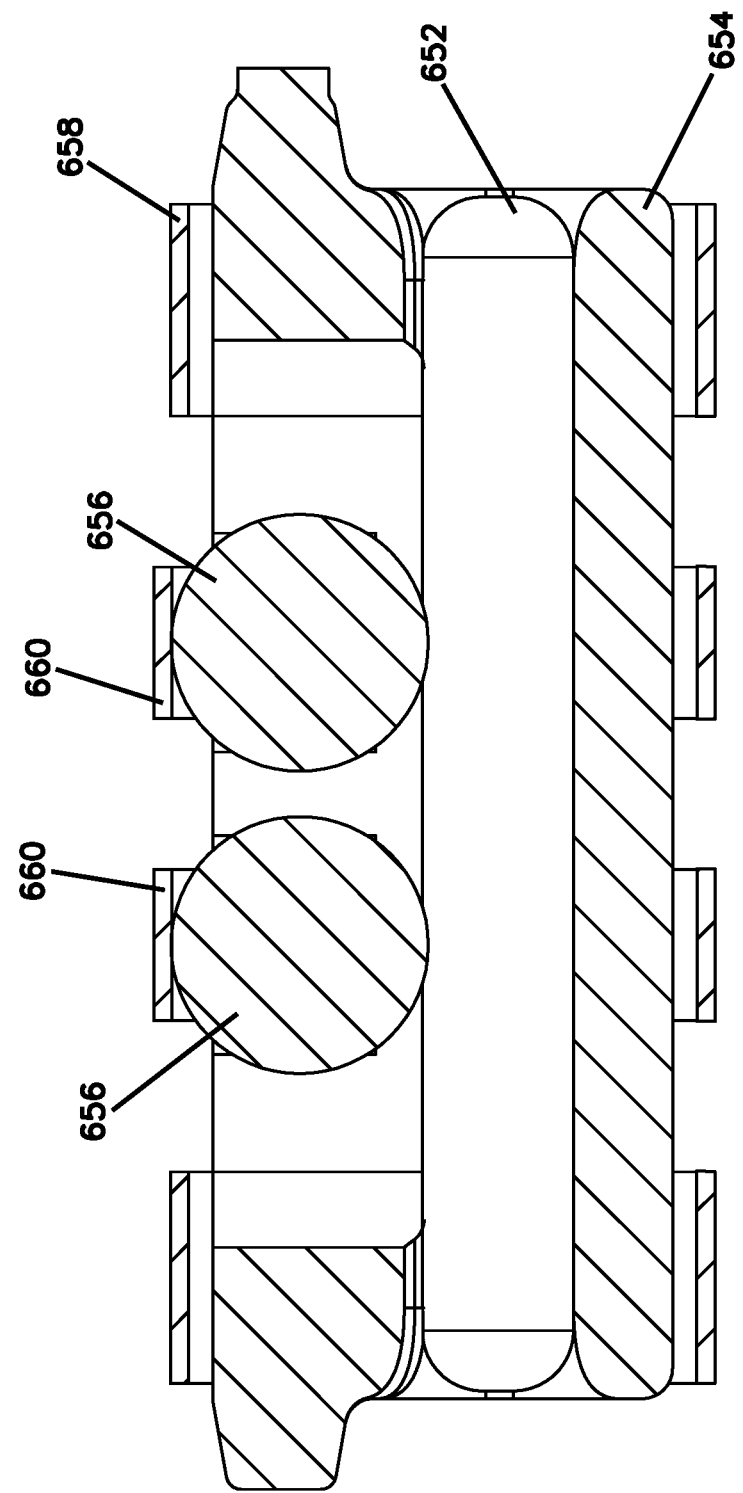
FIG. 15 is an axial cross-sectional view of the alignment device of FIG. 12 along the line D-D of FIG. 14.
Figure 16:
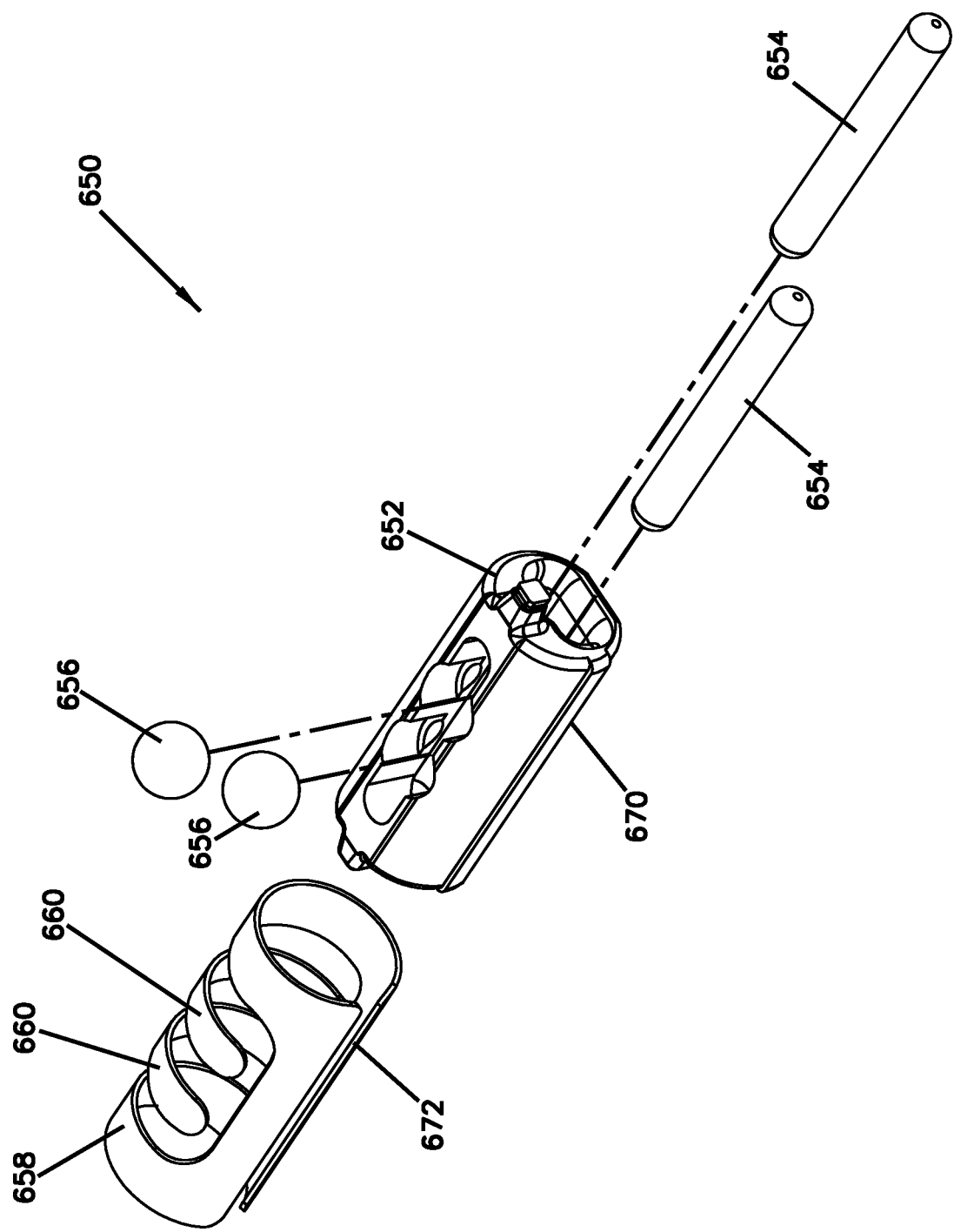
FIG. 16 is an exploded view of the alignment device of FIG. 12.

FIG. 12 is a perspective view of one of the alignment devices 650 of FIG. 6. FIG. 13 is a further perspective of the alignment device 650 of FIG. 12. FIG. 14 is a side view of the alignment device 650 of FIG. 12. FIG. 15 is an axial cross-sectional view of the alignment device 650 of FIG. 12 along the line D-D of FIG. 14. FIG. 16 is an exploded view of the alignment device 650 of FIG. 12.

Referring to FIGS. 12-16, the alignment device 650 includes a housing 652 in which alignment rods 654 and balls 656 are mounted. The rods 654 define a fiber alignment groove for receiving and co-axially aligning optical fibers, such as the optical fiber 10 on a module side of the alignment device 650, and a fiber held by a connector 300 on a connector side of the alignment device 650. A sleeve 658 mounts over the housing 652. The sleeve 658 includes springs 660 that bias the balls 656 toward the groove. In this way, the balls 656 are spring biased so as to force the optical fibers into the groove so as to maintain co-axial alignment. A rib 670 protruding from the housing 652 can couple to a corresponding gap 672 in the sleeve 658 to properly align the housing 652 and the sleeve 658.

In some examples, the housing 652 can be partially filled with adhesive for locking the internal components and the optical fibers 10 in position.

The housing 652 can include a module side portion 664 that receives an optical fiber routed from the module 100, and a connector side portion 666 that receives an optical fiber 50 terminated at a connector 300. The alignment device 650 can provide for optical coupling and/or mechanical coupling of the fiber ends.

In some examples, the fiber end 14 is bonded to the module side portion 664 with an adhesive, while the connector terminated fiber end 51 is not bonded to the connector side portion 666, enabling removal, substitution, and/or replacement of the connectorized fiber 50 that is coupled to the module 100.

In further examples, the fiber end 14 is also not bonded to the alignment device 650. Not bonding the fiber ends 14 to the alignment device can accommodate a buckling of the fiber 10 within a buckling region disposed behind the alignment device 650. For example, the fiber feed portion 606 of the alignment structure 600 can include an enlarged area in which the fiber 10 can bend during an alignment process.

In some examples an optical transmission substance, such as a gel, can be injected in the alignment device 650. The gel can help to align or guide a fiber end as it is inserted into the alignment device 650. The gel can also help to protect the fibers within the alignment device 650, and/or help to prevent contamination of the fiber faces. In some examples, the gel can have a refractive index that matches or approximately matches that of the optical fibers and thereby enhances optical coupling of the fiber 10 and the fiber 50. A gel having an index of refraction that closely approximates that of the optical fibers can reduce Fresnel reflection at the surface of the bare optical fiber ends.

Alternatively, a first coupling medium (e.g., a thixotropic index matching gel) can be provided on the optical path between the optical fiber ends to provide optical coupling between the optical fibers and a second coupling medium (an adhesive with no optical properties required) can be used along the optical fibers 10 to mechanically fixate/couple the optical fibers 10 to the alignment device 650.

Additional, non-limiting examples of alignment devices that can be substituted for the alignment device 650 are described in the '078 publication, and also in PCT Publication No. WO 2013/117598, the disclosures of which are hereby incorporated by reference in their entirety.

Figure 17:
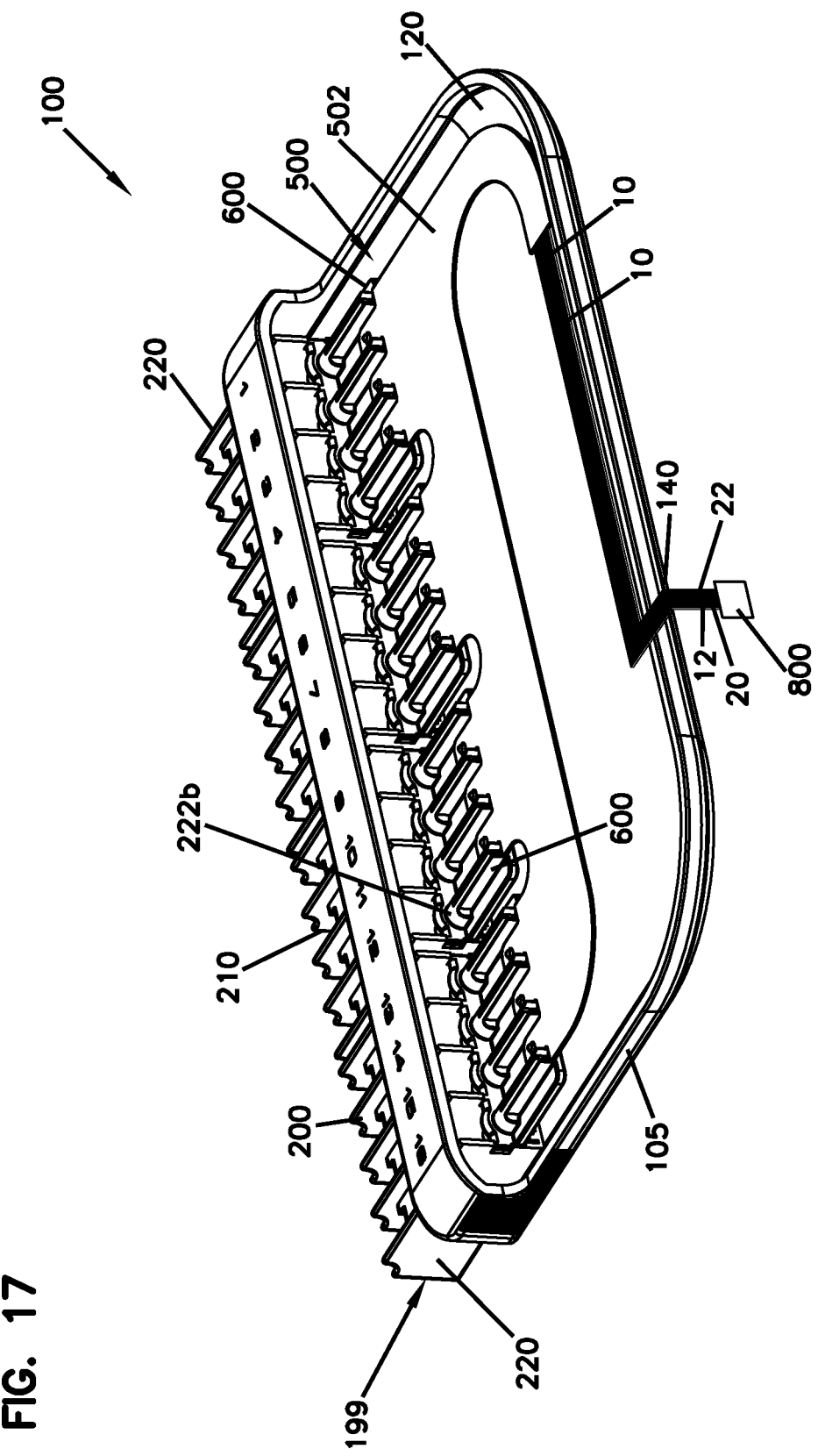
FIG. 17 is a rear, perspective view of a portion of the example telecommunications module of FIG. 1.
Figure 18:
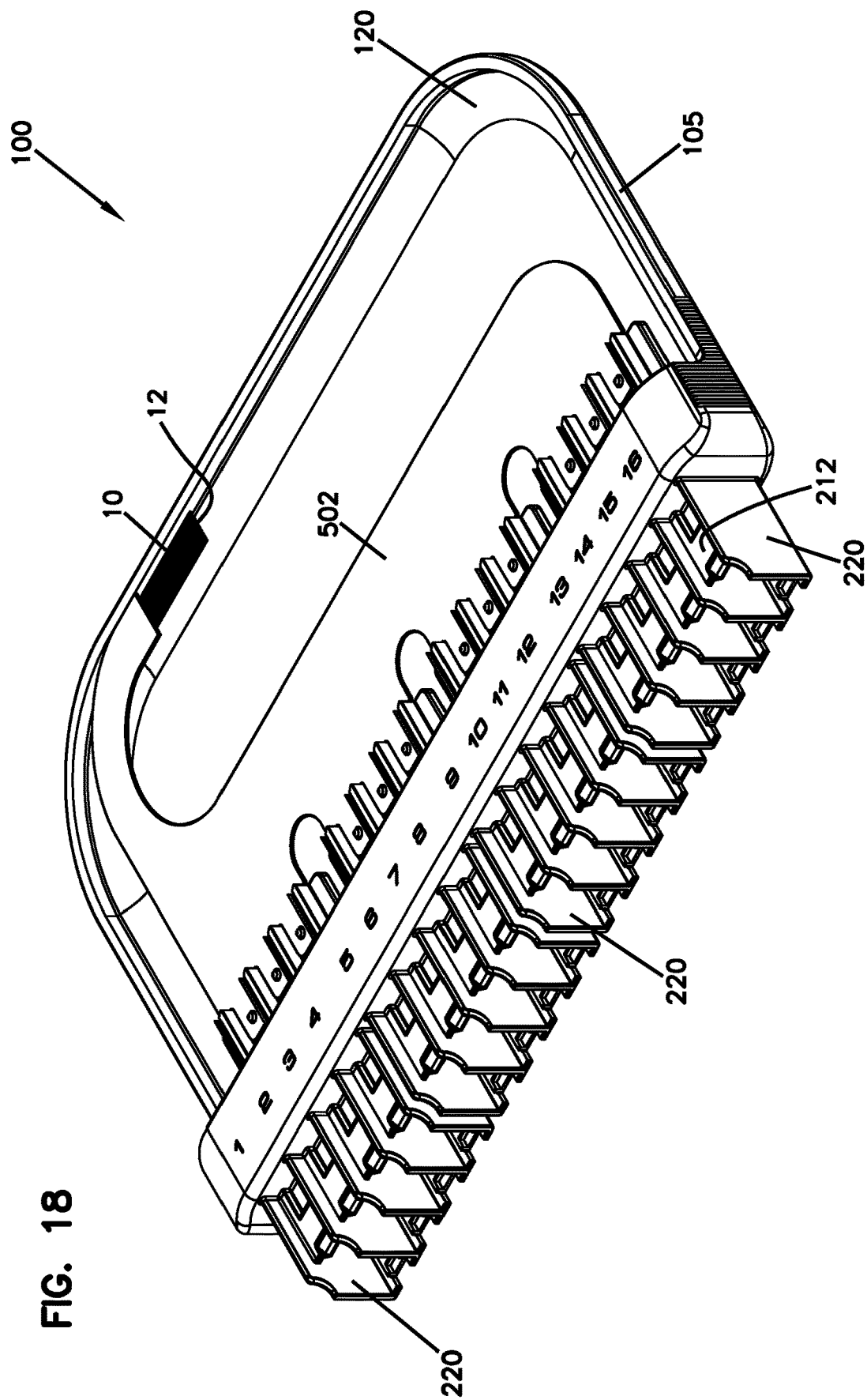
FIG. 18 is a front, perspective view of a portion of the telecommunications module of FIG. 1.

FIG. 17 is a rear perspective view of a portion of the module 100 of FIG. 1. FIG. 18 is a front perspective view of a portion of the module 100 of FIG. 1.

Referring to FIGS. 17-18, the module 100 includes the shell piece 105, with the other shell piece 103 removed, exposing the interior volume 120 in which the optical circuit 500 is housed. Furthermore, in this example, the proximal ends of the distal housing portions 220 mate and/or interlock with the proximal housing portions 600 within the interior volume 120, with distal portions of the distal housing portions protruding forwardly exterior to the interior volume 120 so that they can receive the connectors 300. The interior volume 120 can be contoured and sized to receive the optical circuit 500 and the proximal housing portions 600 in a space-conscious fashion. In some examples, one or more protective elements can be included in the interior volume 120 to protect various components from damage. After installing the optical circuit 500 and the proximal housing portions 600, the piece 103 can be snap-fitted or otherwise mated to the piece 105 to complete the module 100. The distal housing portions 220 can be coupled to the proximal housing portions 600 before or after the piece 103 is coupled to the piece 105.

Referring to FIG. 17, a port 140 is schematically shown in the shell piece 105. The optical fibers 10 can be spliced to stubs 20 (at splice location 22) that are terminated at a multi-fiber terminating device represented schematically as 800. Alternatively, in a splice-less arrangement, the fibers 10 can themselves form the stubs and ends of the fibers 10 can be directly terminated at location 800. The multi-fiber terminating device 800 can be, e.g., a fiber optic (e.g., MPO) connector or multi-fiber non-ferrulized fiber alignment device (as described below) disposed in, or not in, the port 140. It should be appreciated that the port 140 can be disposed at any desired location in the shell 101, including on the same side as the adapters 200.

Figure 19:
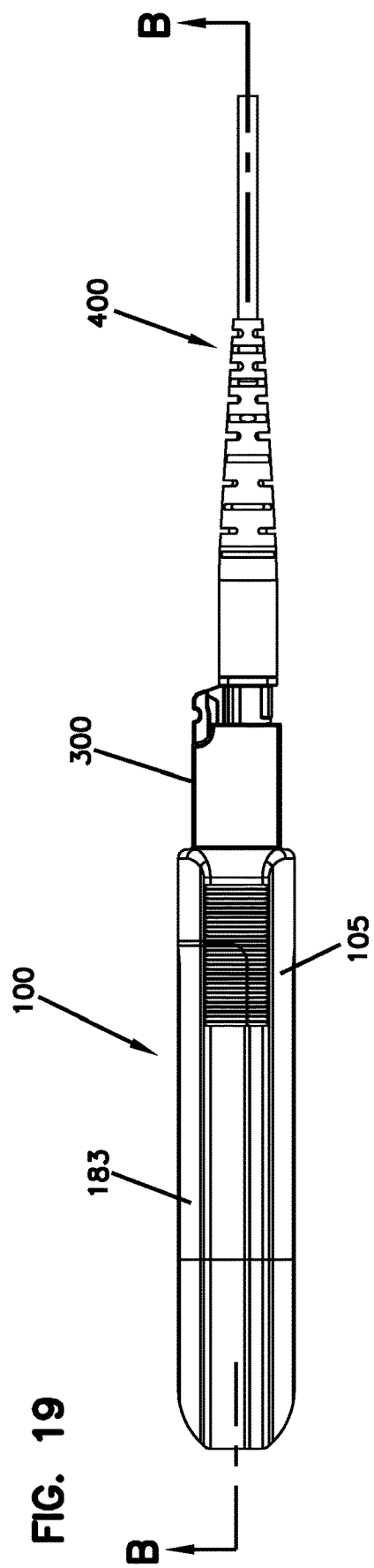
FIG. 19 is a side view of the telecommunications module of FIG. 1, including one example connector and one example cable assembly connected thereto.
Figure 20A:
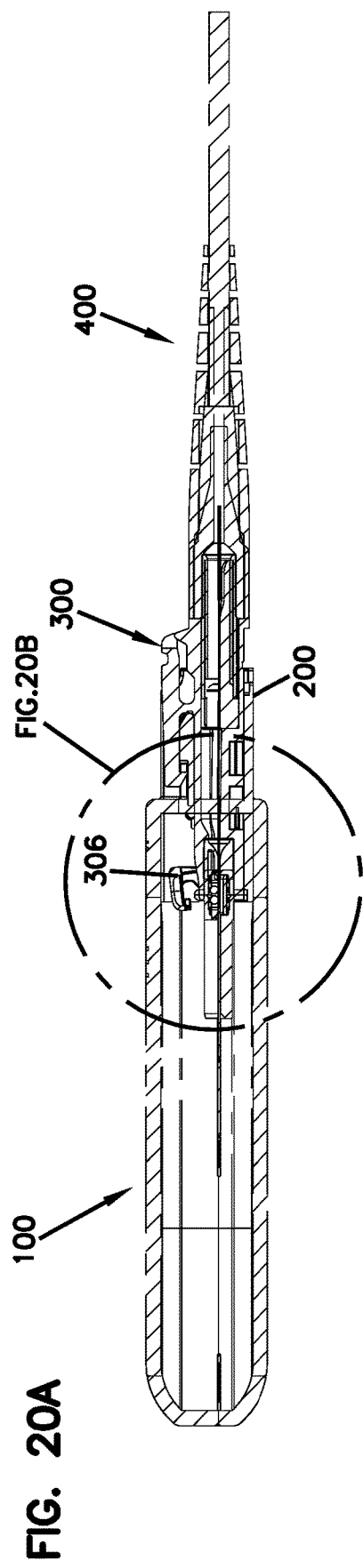
FIG. 20A is a cross-sectional view of the module, connector, and cable assembly of FIG. 19 along the line B-B in FIG. 19, with the shutter of the connector in an open position.
Figure 20B:
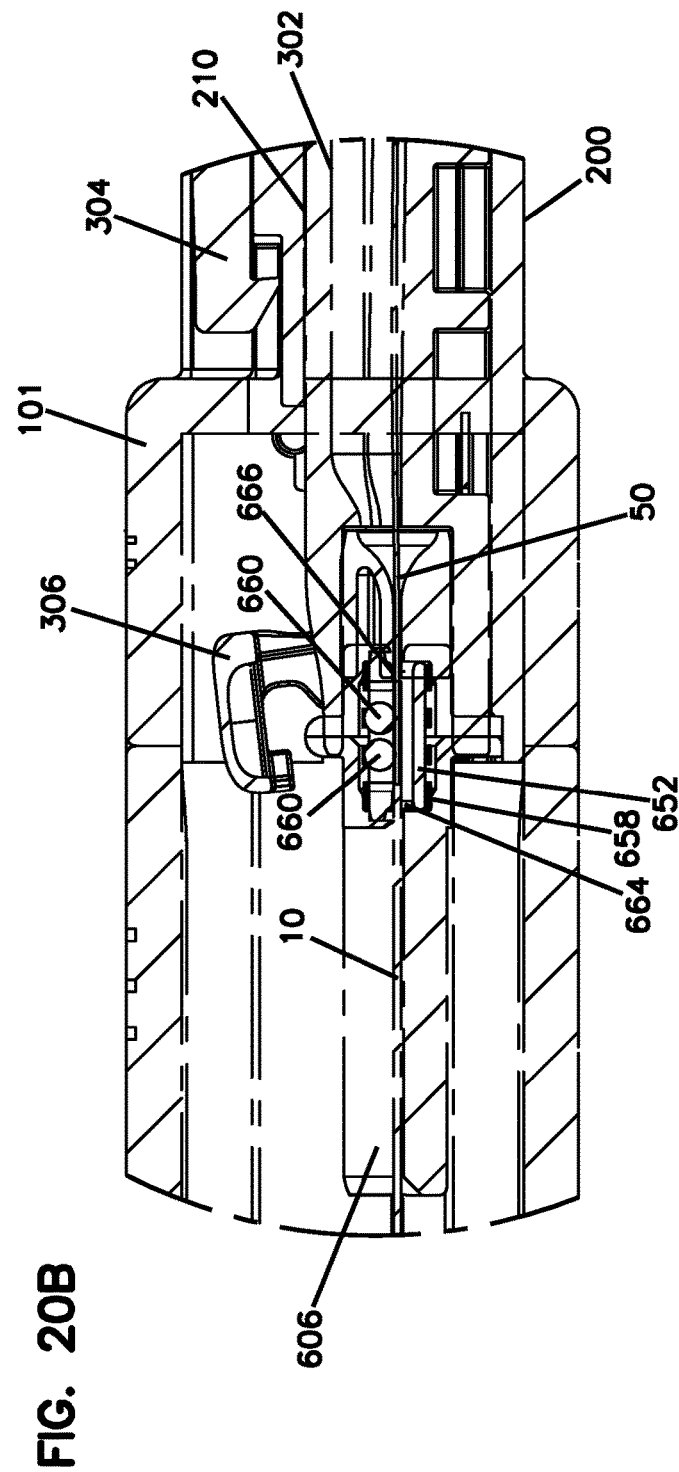
FIG. 20B is an enlarged view of the call out portion of FIG. 20A.
Figure 21:
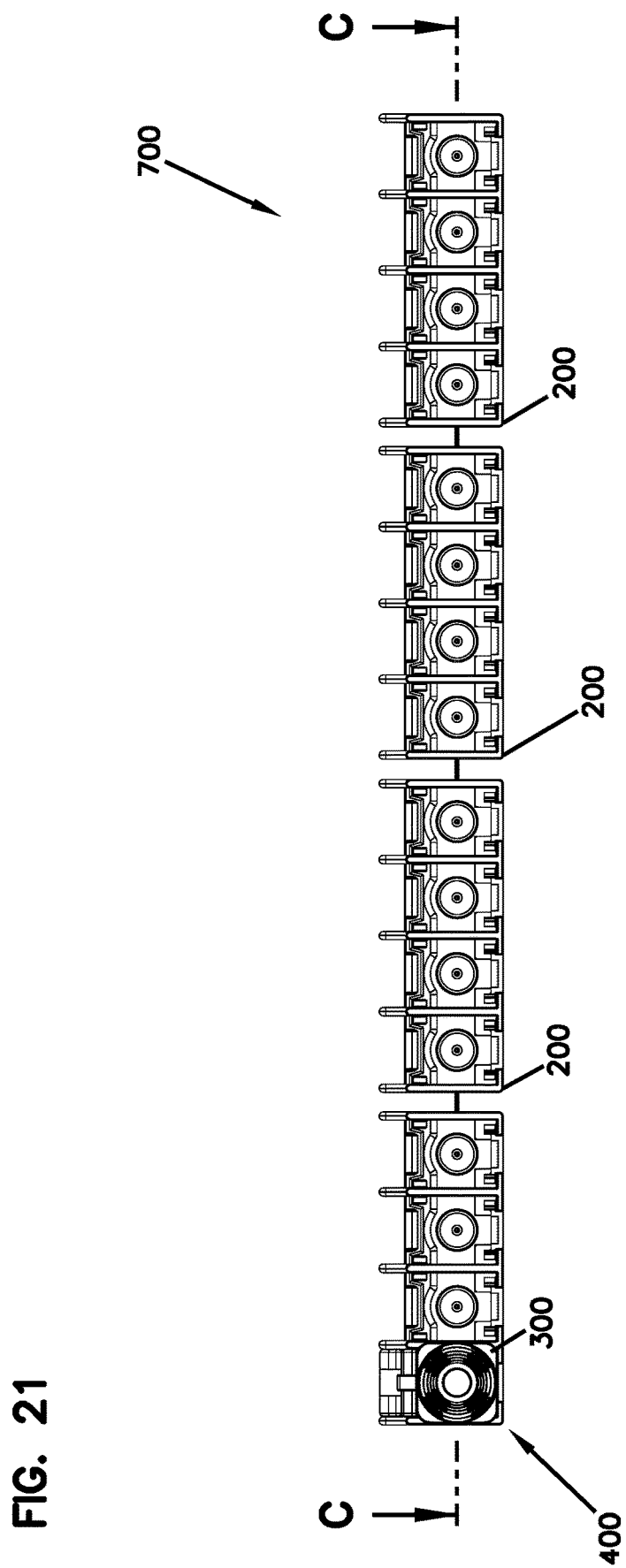
FIG. 21 is a front view of the assembly of FIG. 8, including an example connector and an example cable assembly.
Figure 22:
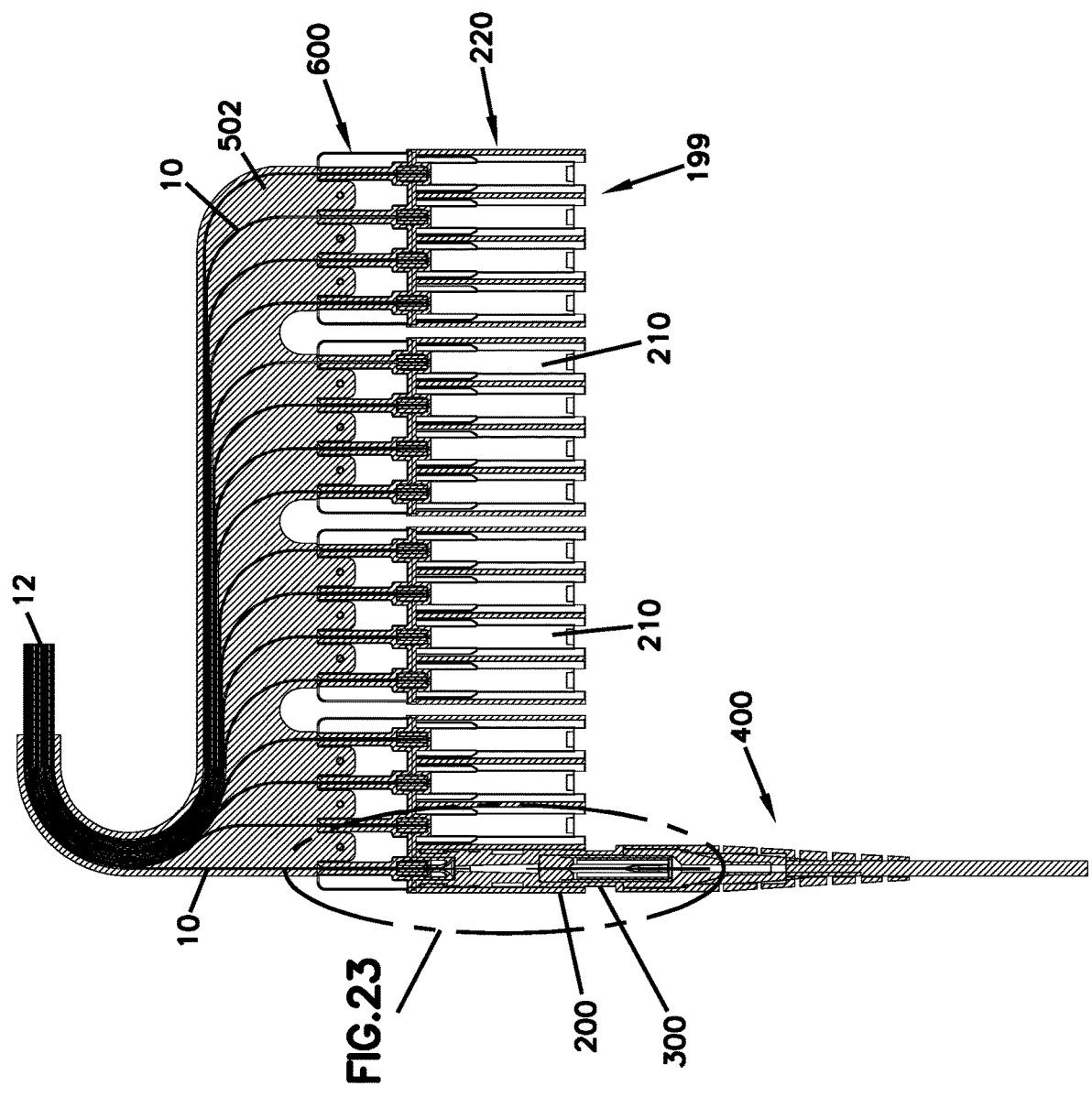
FIG. 22 is a cross-sectional view along the line C-C in FIG. 21.
Figure 23:
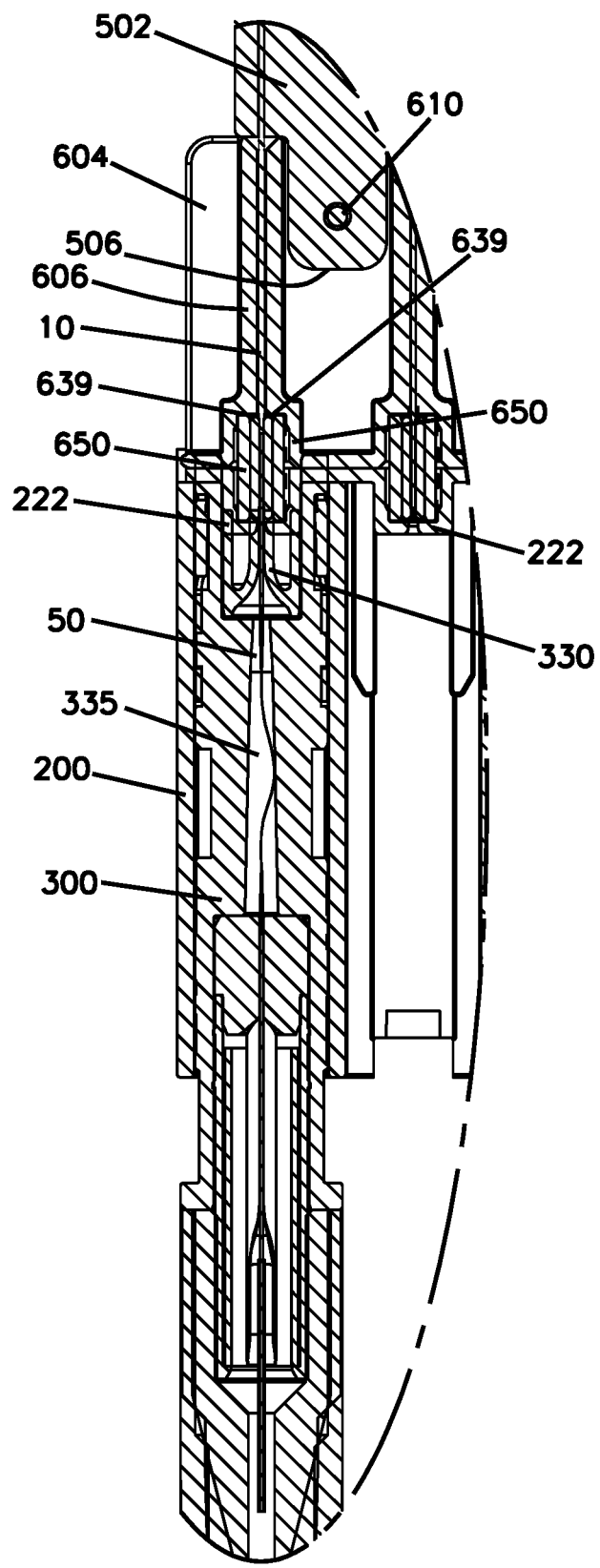
FIG. 23 is an enlarged view of the callout portion of FIG. 22.

FIG. 19 is a side view of the module 100 of FIG. 1, including just one connector 300 and cable assembly 400 connected thereto. FIG. 20A is a cross-sectional view of the module 100, connector 300, and cable assembly 400 of FIG. 19 along the line B-B in FIG. 19, with the shutter 306 of the connector 300 in an open position. FIG. 20B is an enlarged view of the call out portion of FIG. 20A. FIGS. 20A and 20B will be referred to, collectively, as FIG. 20. FIG. 21 is a front view of the assembly 700 of FIG. 8, including an example connector 300 and an example cable assembly 400. FIG. 22 is a cross-sectional view along the line C-C in FIG. 21. FIG. 23 is an enlarged view of the callout portion of FIG. 22.

Referring to FIGS. 19-23, the ferrule-less connector 300 is installed in a connector port 210 such that the latch 304 lockingly engages the notch 216 of the connector port defining structure 200. The fibers 10 and 50 are axially aligned in the alignment device 650. A central fiber positioning piece 330 disposed in the proximal recess 333 (FIG. 4B) of the connector 300 can abut the sleeve 222 of the connector port defining structure 200. The connector 300 can include a fiber buckling region 335 distally from the recess 333.

In one example, the fiber ends 14 of the substrate fibers 10 are affixed in the alignment devices 650, and fiber buckling regions are not required for the substrate fibers (e.g., no buckling region is required for the fibers 10 within the passages 606 or elsewhere), and buckling of the connector fibers 50 in the buckling regions 335 can be relied upon to properly optically connect the fibers 10 to the fibers 50 (e.g., to assist in elastically biasing the fibers 10, 50 in end-to-end contact with each other). As discussed above, however, in those examples in which the fiber ends 14 are not bonded to the alignment devices 650, buckling regions can also be provided for the fibers 10, enabling buckling on both sides of the fiber-to-fiber interface which forms the demateable optical coupling.

The alignment device 650 is positioned between, on the one hand, a forward facing annular shoulder 639 of the sleeve portion 222b, which is positioned at a forward end of the feeding portion 606 and, on the other hand, the annular shoulder 641 of the sleeve portion 222a. Interior diameters of the cavity 201 can be configured to snugly house the alignment device 650. The sleeve portion 222a can fit within the recess 333 of the connector 300 when connection is achieved.

In some examples, while the fiber 10 is permanently affixed to the alignment device 650, the fiber 50 is mateable and demateable with the alignment device 650, permitting removal and re-installation of the same or different connector 300.

Figure 24:
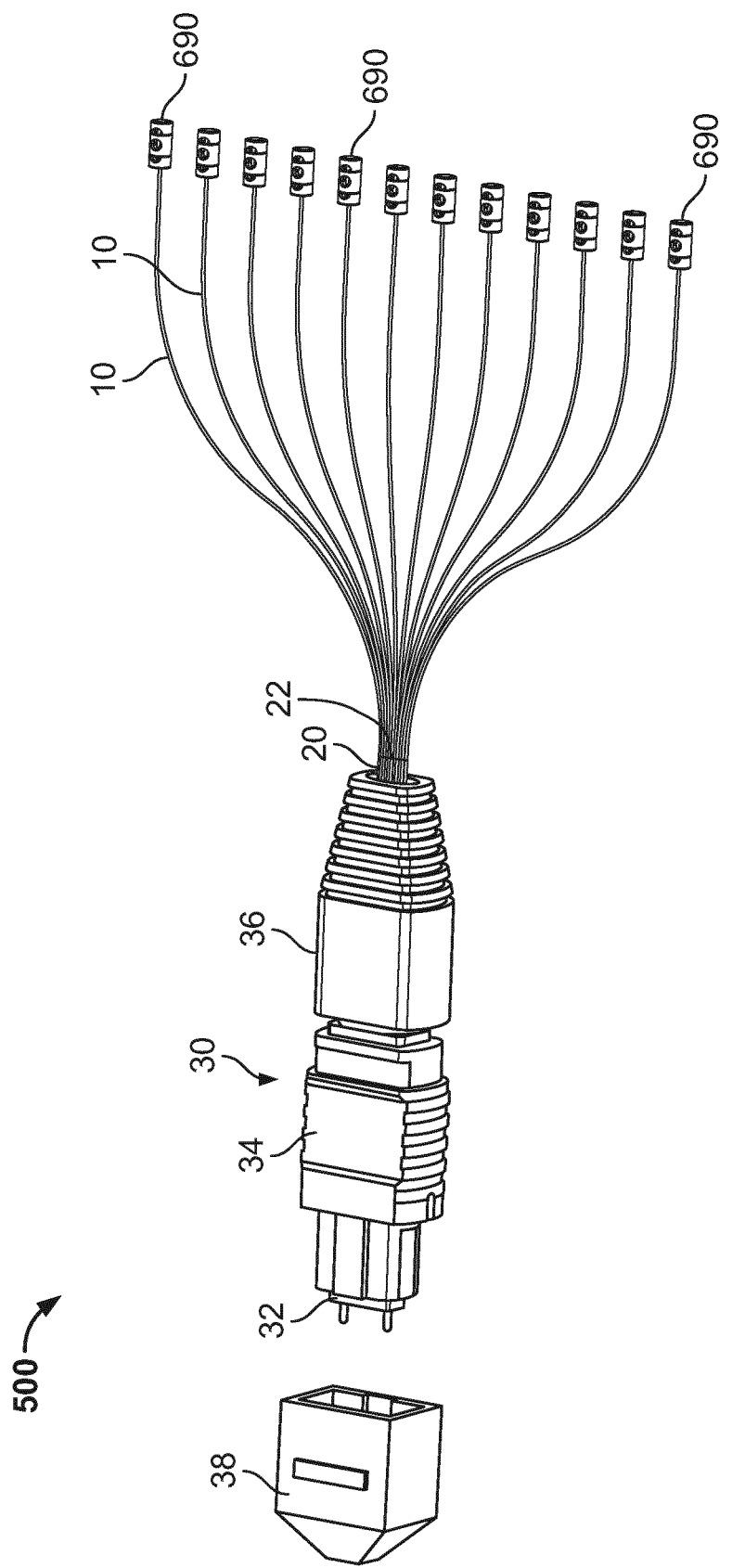
FIG. 24 schematically shows an example connectorization scheme at the rear of the optical circuit of FIG. 6.

FIG. 24 schematically shows an example connectorization scheme at the rear of the optical circuit 500 of FIG. 6. Referring to FIG. 24, forward ends of the fibers 10 supported on the substrate 502 (FIG. 6) are terminated (or spliced to stubs that are terminated) in alignment devices 690

The alignment device 690 includes a plurality of fiber alignment components 691, each defining an axially oriented funnel shape to facilitate entry of the fiber 10, 50 along the fiber alignment axis. The fiber alignment components 691 are positioned front to back in a stack, the outer two serving as a pre-alignment structure and the inner two aligning the two mating fibers in an interior contact zone. One or more (typically each) of the fiber alignment components 691 includes a cantilever member 692 that presses the fiber toward a groove structure, such as a V-groove within the component, or a gap or slot defined by rods 693.

Back ends of the fibers 10 are spliced at splice location 22 to fiber stubs 20 of ribbonized fibers which are terminated in a MPO connector 30 having a body 34, a ferrule 32, a protective boot 36, and an optional, removable dust cap 38 for protecting the ferrule 32 when connectivity is not desired. Alternatively, the back ends of the fibers 10 can be terminated directly at the connector 30, thereby eliminating splicing. In certain examples, the connector 30 can have a minimized cost version with only a multi-fiber ferrule or with a reduced number of components (e.g., the boot and/or the release sleeve and/or the connector body may optionally be eliminated). Part or all of the connector 30 can be housed in the interior volume 120 of the module 100, and/or part of the connector 30 can be disposed in a port in the shell 101 of the module 100, such as the port 140 shown in FIG. 17. Alternatively, the connector 30 can be outside the module shell at the end of a multi-fiber stub. For example, the optical fibers 10 or stubs 20 (i.e., tethers) can be fed outside of the module 100 (e.g., via the port 140) such that the connector 30 remains outside the module 100.

Figure 25:
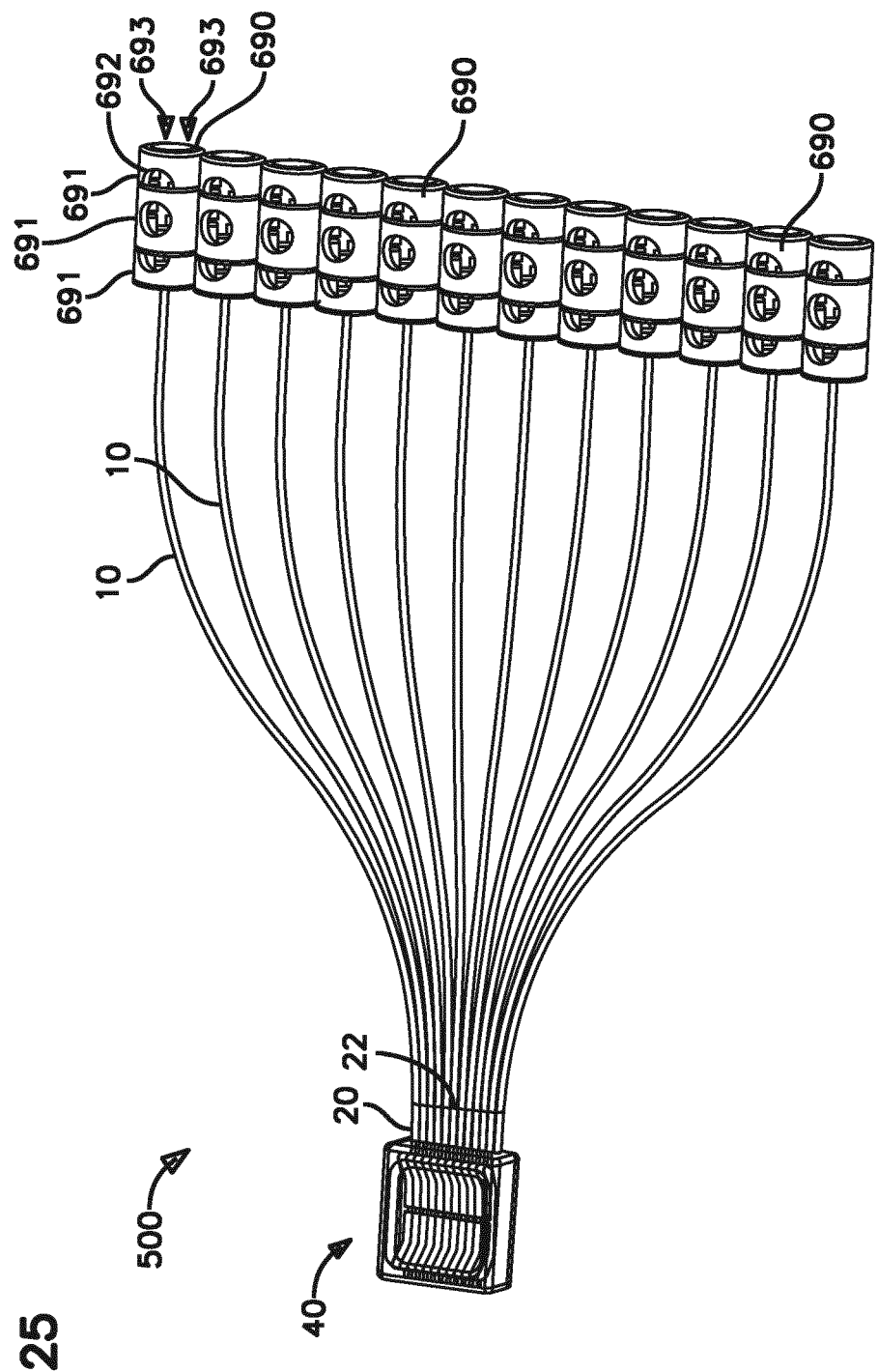
FIG. 25 schematically shows a further example connectorization scheme at the rear of the optical circuit of FIG. 6, including an example multi-fiber fiber alignment device for aligning non-ferrulized optical fibers, with portions of the device's body depicted as transparent to aid illustration.
Figure 26:
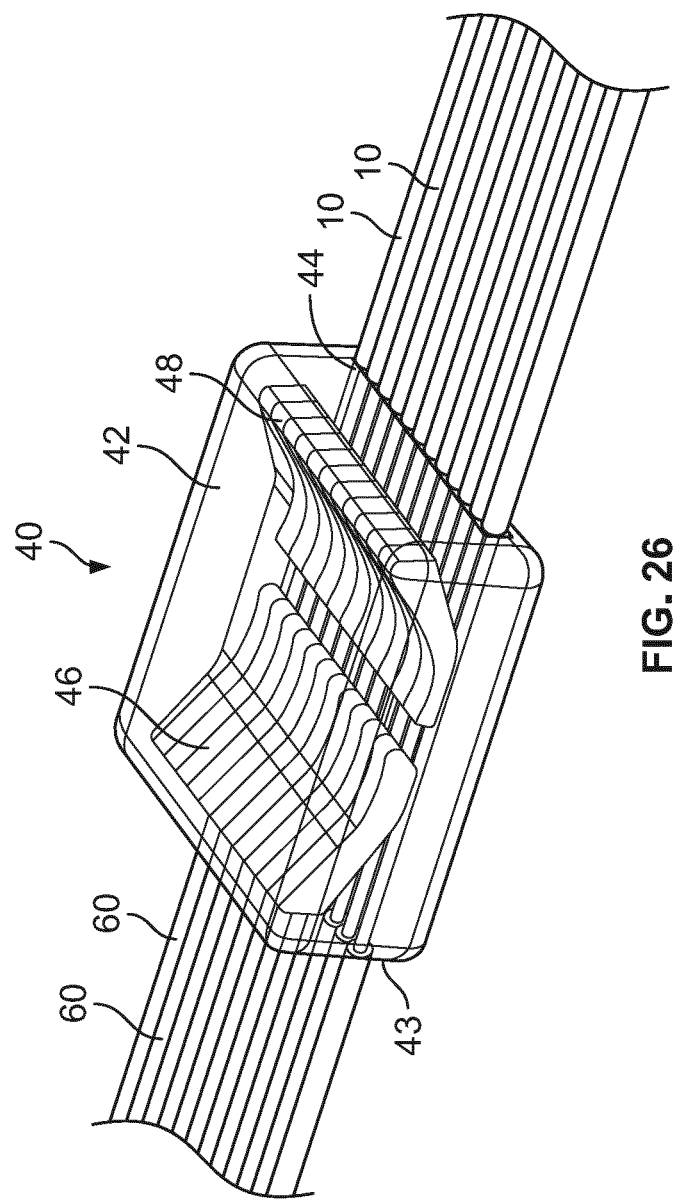
FIG. 26 is an enlarged view of the multi-fiber ferrule-less alignment device of FIG. 25, with portions of the device's body depicted as transparent to aid illustration.

FIG. 25 schematically shows a further example connectorization scheme at the rear of the optical circuit 500 of FIG. 6, including an example multi-fiber non-ferrulized fiber alignment device 40. FIG. 26 is an enlarged view of the multi-fiber non-ferrulized fiber alignment device of FIG. 25.

Referring to FIGS. 25-26, forward ends of the fibers 10 supported on the substrate 502 (FIG. 6) are terminated (or spliced to stubs that are terminated) in alignment devices 690. Back ends of the fibers 10 are optically received in a multi-fiber ferrule-less alignment device 40 and therein coaxially aligned with corresponding fibers 60 whose ends are also disposed in the alignment device 40. In other examples, the back ends of the fibers 10 can be spliced to fiber stubs that are routed to the alignment device 40 and optically coupled to the fibers 60.

Part or all of the alignment device 40 can be housed in the interior volume 120 of the module 100, and/or part of the alignment device 40 can be disposed in a port in the shell 101 of the module 100, such as the port 140 shown in FIG. 17. Alternatively, the optical fibers 10 or stubs can be fed outside of the module 100 (e.g., via the port 140) such that the alignment device 40 remains outside the module 100.

The example alignment device 40 includes a body 42 defining an interior alignment cavity 44 that extends axially (i.e., along the fiber axis) from a proximal end 41 to a distal end 43 of the body 42. The alignment device 40 further includes sets of cantilever members 46 and 48 configured to bias the fibers/stubs 60 and 20, respectively into axial alignment with each other within the cavity 44. In some non-limiting examples, an index matching or index non-matching adhesive is provided in a portion of the cavity 44 towards the proximal end 41 to mechanically secure the ends of the fibers 10 (or the ends of the fiber stubs in the spliced version) to the alignment device 40, while the optical fibers 60 are not mechanically coupled to the alignment device 40, allowing the fibers 60 to be mated and de-mated from the alignment device 40. In some examples, an index matching gel can be provided in at least a portion of the alignment cavity 44 (e.g., at the fiber-to-fiber interface) to provide or enhance optical coupling of the fibers/stubs 20 to the fibers 60.

Figure 27:
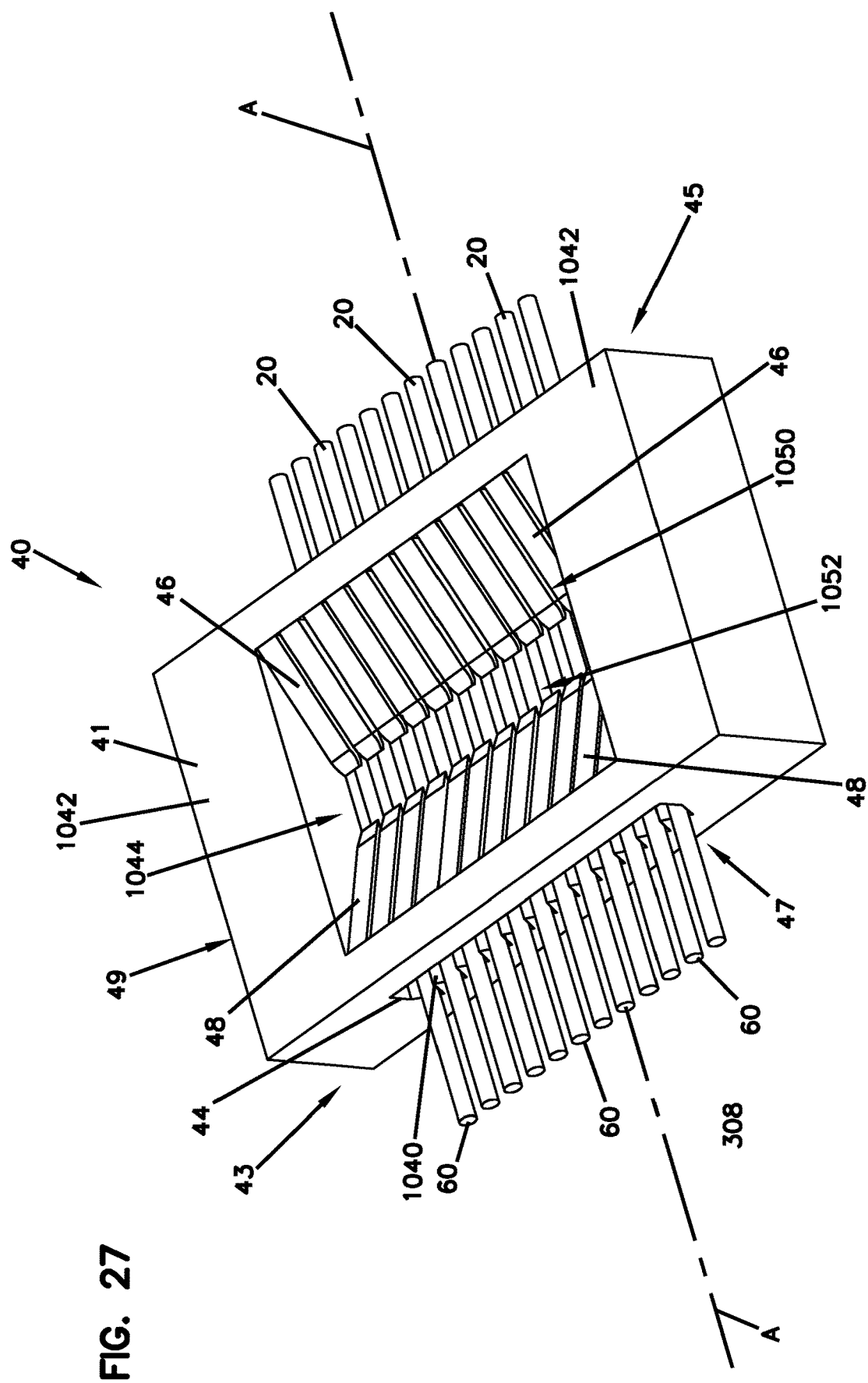
FIG. 27 is a further view of the multi-fiber fiber alignment device of FIG. 26 with a modified body, showing portions of non-ferrulized fibers/stubs disposed therein.
Figure 28:
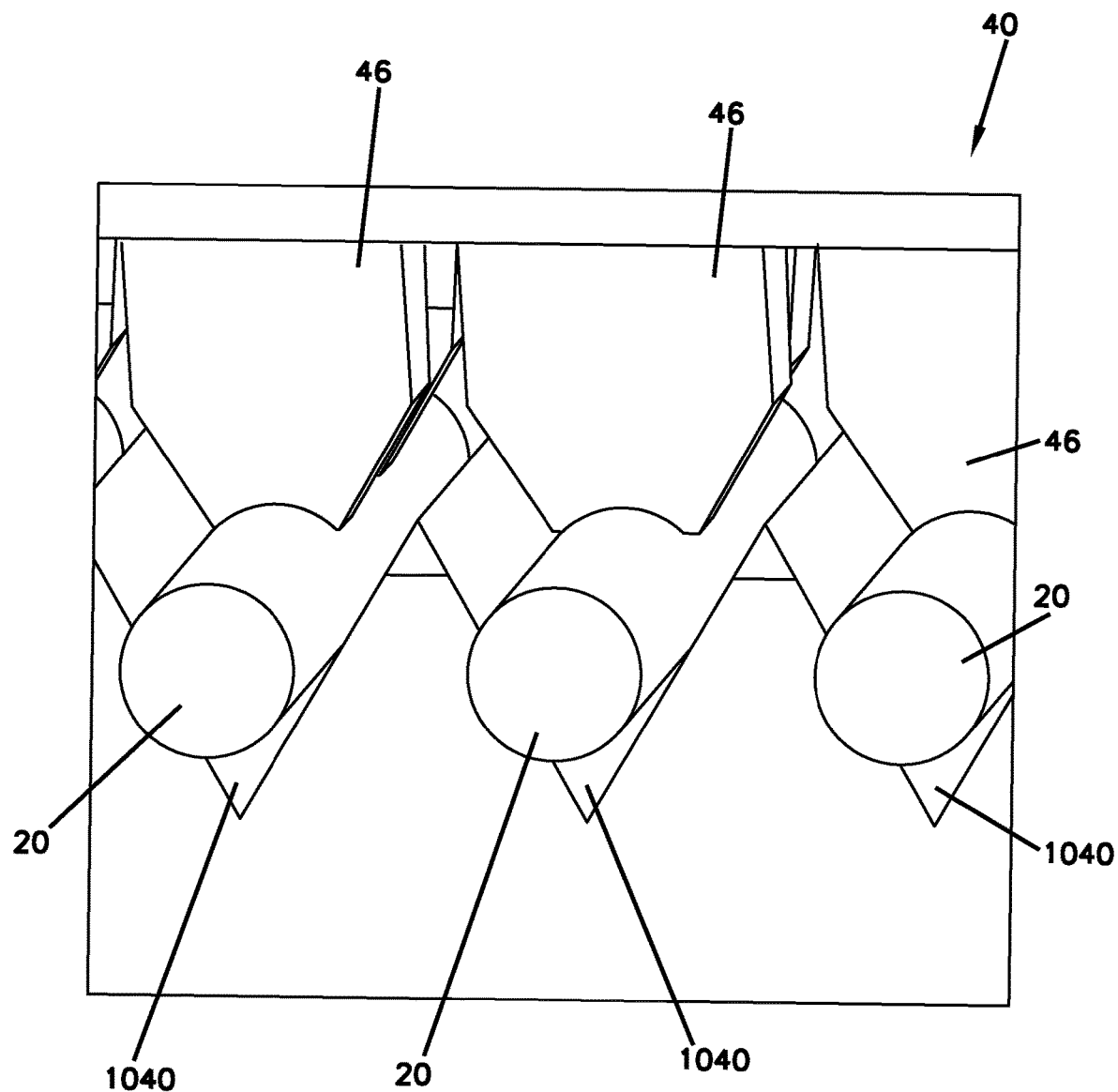
FIG. 28 is a front view of the alignment device of FIG. 27.

FIG. 27 is a further view of the multi-fiber ferrule-less alignment device 40 of FIG. 26, showing portions of the fibers 10 and 60 disposed therein. FIG. 28 is a front view of the alignment device 40 of FIG. 27.

Referring to FIGS. 27-28, each set of fibers 60 and 10 is a fiber optic ribbon cable having a fiber axis A. The alignment device 40 can be made from molded materials, and includes a body 41 having a first end 43, a second end 45, a top 49 and a bottom 47. The first end 43 defines a first opening to the alignment cavity 44 and the second end defines an opposite second opening to the alignment cavity 44. The first and second openings each provide for optical fibers (10, 60) to be centered and oriented in the bottom of the device 40. The bottom 47 has a plurality of groove structures 1040 integrally formed, such as a V-grooves, or gaps, or slots. It will be appreciated that the groove structures 1040 can include other groove profiles using various materials and manufacturing processes. In this example, the groove structures 1040 are V-grooves in parallel alignment that extend along the fiber axis A.

The top 49 of the body 41 comprises a planar region 1042. The planar region 1042 contains a recess 1040 including a plurality of cantilever members 46 and 48 configured to press the optical fibers in the grooves.

In this example, a first set of cantilever members 48 are generally on the first end 43 and can extend downwardly in the recess 1044 at an angle toward the optical fibers 60. A second set of cantilever members 46 are generally on the second end 45 and can extend downwardly at an angle toward the optical fibers 20 at the second opening. The cantilever members (46, 48) can be flexible and configured for urging each of the optical fibers into their respective groove structures to align the fibers 20 with the fibers 60 in the groove structures.

The recess 1044 has an open bottom 1050 such that a fiber alignment region 1052 is made visible between the first and second sets of cantilever members 46 and 48. The cantilever members are arranged and configured on opposite sides of the fiber alignment region 1052. The cantilever members are shown having one row on each side of the fiber alignment region 1052. It will be appreciated that other embodiments can include two or more rows on each side of the fiber alignment region 1052.

The alignment device 40 can be assembled as a single module or unit including the groove structures and cantilever members, or alternatively as multi-piece assembly.

Although in the foregoing description, terms such as "top," "bottom," "front," and "back"/"rear" were used for ease of description and illustration, no restriction is intended by such use of the terms. The modules and their components described herein can be used in any orientation, depending upon the desired application. With respect to the present disclosure, two optical fibers spliced together can be considered as one optical fiber.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A fiber optic module, comprising:
a shell defining an interior volume of the module;
a flexible substrate positioned in the interior volume of the module; and
a plurality of optical fibers extending longitudinally from first longitudinal ends of the optical fibers to second longitudinal ends of the optical fibers, the optical fibers being routed through the fiber optic module, the optical fibers being bonded to the flexible substrate along fiber routing paths that fan out on the substrate such that the optical fibers are routed through the interior volume between first end portions of the optical fibers and second end portions of the optical fibers, the first end portions including the first longitudinal ends being positioned in a plurality of single fiber alignment devices of a fiber alignment interface of the module, each single fiber alignment device being configured to receive an end portion of another optical fiber together with the first longitudinal end of one of the optical fibers, each single fiber alignment device including one or more spring loaded components for biasing the one of the optical fibers and the another optical fiber into a groove of the single fiber alignment device and into alignment with each other within the groove, the second end portions including the second ends and defining an end of a ribbon cable extending from an outer edge of the substrate and in which the optical fibers are arranged in a row, the end of the ribbon cable being located off the substrate and being received in a row in a cavity of a multi-fiber mechanical alignment device being configured to receive end portions of other optical fibers as well, the multi-fiber mechanical alignment device including spring loaded components for biasing the optical fibers and the other optical fibers into grooves of the multi-fiber mechanical alignment device and into alignment with one another within the grooves.

2. The fiber optic module of claim 1, wherein the first end portions of the optical fibers are bare optical fibers.

3. The fiber optic module of claim 1, wherein the first end portions of the optical fibers are adhesively secured within the single fiber alignment devices.

4. The fiber optic module of claim 1, wherein the second end portions of the optical fibers include end faces that are embedded in index matching gel within the multi-fiber mechanical alignment device.

5. The fiber optic module of claim 1, wherein at least 6, 12, 18 or 24 single fiber alignment devices are provided.

6. The fiber optic module of claim 1, wherein the fiber optic module includes a splitter or a wavelength division multi-plexer.

7. The fiber optic module of claim 1, wherein the fiber optic module includes an optical component including a passive optical power splitter or a wavelength division multiplexer, wherein the optical fibers are optically coupled to outputs of the optical component.

8. A method for making the fiber optic module of claim 1, comprising the steps of:
    adhering the optical fibers to the substrate along fiber routing paths with the first end portions and the second end portions of the optical fibers projecting outwardly beyond an exterior boundary of the substrate;
    cleaving the first end portions and the second end portions of the optical fibers that project outwardly from the substrate;
    processing end faces of the cleaved, first and second end portions of the optical fibers;
    inserting the processed, first end portions of the optical fibers into openings of the single fiber alignment devices; and
    inserting the processed, second end portions of the optical fibers into an opening of the multi-fiber mechanical alignment device.

9. The method of claim 8, wherein the first end portions of the optical fibers that project from the substrate are arranged in a row, wherein the single fiber alignment devices are held in a row within a fixture at a spacing that matches a spacing of the first end portions, and wherein the end portions are simultaneously inserted into the single fiber alignment devices.

10. The fiber optic module of claim 1, wherein the optical fibers include splices bonded to the substrate.

* * * * *